US008036310B2

(12) United States Patent
Ban

(10) Patent No.: US 8,036,310 B2
(45) Date of Patent: Oct. 11, 2011

(54) TRANSMITTER AND RECEIVER

(75) Inventor: Koichiro Ban, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 606 days.

(21) Appl. No.: 12/191,549

(22) Filed: Aug. 14, 2008

(65) Prior Publication Data

US 2009/0060090 A1 Mar. 5, 2009

(30) Foreign Application Priority Data

Aug. 29, 2007 (JP) ................................. 2007-223149

(51) Int. Cl.
*H04L 27/20* (2006.01)
*H04L 27/22* (2006.01)

(52) U.S. Cl. ........................................ 375/308; 375/329

(58) Field of Classification Search .................. 375/260, 375/285, 295, 308, 316, 329, 340, 346; 370/210, 370/350, 491; 455/500–501, 67.13
See application file for complete search history.

(56) References Cited

U.S. PATENT DOCUMENTS

| 5,414,734 | A * | 5/1995 | Marchetto et al. ............ 375/267 |
| 5,748,677 | A * | 5/1998 | Kumar ........................... 375/285 |
| 6,952,454 | B1 * | 10/2005 | Jalali et al. ..................... 375/260 |
| 2005/0237954 | A1 * | 10/2005 | Hasegawa et al. ............ 370/292 |
| 2008/0182532 | A1 * | 7/2008 | Kobayashi et al. ........ 455/127.2 |

OTHER PUBLICATIONS

Uli Sorger, et al., "Interleaved FDMA—A New Spread-Spectrum Multiple-Access Scheme", IEEE, 1998, pp. 1013-1017.

* cited by examiner

*Primary Examiner* — Khanh C Tran
(74) *Attorney, Agent, or Firm* — Oblon, Spivak, McClelland, Maier & Neustadt, L.L.P.

(57) ABSTRACT

There is provided with a transmitter including: a pilot generation unit configured to generate a plurality of pilot symbols; a bit sequence generation unit configured to invert each bit in a first bit sequence to generate a second bit sequence; a transmission block generation unit configured to generate a transmission block by giving phase rotation determined according a value of each of bits in the first and second bit sequence to each of the pilot symbols corresponding to each of the bits; and a transmission unit configured to transmit the transmission block.

15 Claims, 48 Drawing Sheets

FIG. 9

| SUBCARRIER NUMBER | FREQUENCY DATA |
|---|---|
| 0 | X(1) |
| 1 | X(2) |
| 2 | X(3) |
| 3 | X(4) |
| 4 | X(5) |
| 5 | X(6) |
| ... | ... |
| N-6 | X(N-5) |
| N-5 | X(N-4) |
| N-4 | X(N-3) |
| N-3 | X(N-2) |
| N-2 | X(N-1) |
| N-1 | X(N) |

| FIRST MODULATION SIGNAL POINT | | SECOND MODULATION SIGNAL POINT | | | TRANSMISSION MODULATION SIGNAL POINT | |
|---|---|---|---|---|---|---|
| a(n) | FIRST DATA SEQUENCE | b(n) | SECOND DATA SEQUENCE | PHASE ROTATION | x(n)=a(n)+b(n) | x(N/2+n)=a(n)-b(n) |
| PA1 | 00 | PB10 | 0 | | PX2 | PX1 |
| | | PB11 | 1 | -π/4 | PX1 | PX2 |
| PA2 | 10 | PB20 | 0 | | PX3 | PX2 |
| | | PB21 | 1 | π/4 | PX2 | PX3 |
| PA3 | 01 | PB10 | 0 | | PX3 | PX4 |
| | | PB11 | 1 | -π/4 | PX4 | PX3 |
| PA4 | 11 | PB20 | 0 | | PX4 | PX1 |
| | | PB21 | 1 | π/4 | PX1 | PX4 |

FIG. 20

| FIRST MODULATION SIGNAL POINT | | SECOND MODULATION SIGNAL POINT | | | TRANSMISSION MODULATION SIGNAL POINT | |
|---|---|---|---|---|---|---|
| a(n) | FIRST DATA SEQUENCE | b(n) | SECOND DATA SEQUENCE | PHASE ROTATION | x(n)=a(n)+b(n) | x(N/2+n)=a(n)-b(n) |
| PA1 | 00 | PB11 | 0 | $3\pi/4$ | PX1 | PX2 |
|  |  | PB10 | 1 |  | PX2 | PX1 |
| PA2 | 10 | PB21 | 0 | $-3\pi/4$ | PX2 | PX3 |
|  |  | PB20 | 1 |  | PX3 | PX2 |
| PA3 | 01 | PB10 | 0 | $-\pi/4$ | PX3 | PX4 |
|  |  | PB11 | 1 |  | PX4 | PX3 |
| PA4 | 11 | PB20 | 0 | $\pi/4$ | PX4 | PX1 |
|  |  | PB21 | 1 |  | PX1 | PX4 |

FIG. 21

| FIRST MODULATION SIGNAL POINT | | SECOND MODULATION SIGNAL POINT | | | TRANSMISSION MODULATION SIGNAL POINT | |
|---|---|---|---|---|---|---|
| a(n) | FIRST DATA SEQUENCE | b(n) | SECOND DATA SEQUENCE | PHASE ROTATION | x(n)=a(n)+b(n) | x(N/2+n)=a(n)-b(n) |
| PA1 | 00 | PB10 | 0 | $-\pi/4$ | PX2 | PX1 |
|  |  | PB11 | 1 |  | PX1 | PX2 |
| PA2 | 10 | PB20 | 0 | $\pi/4$ | PX3 | PX2 |
|  |  | PB21 | 1 |  | PX2 | PX3 |
| PA3 | 01 | PB10 | 0 | $-\pi/4$ | PX3 | PX4 |
|  |  | PB11 | 1 |  | PX4 | PX3 |
| PA4 | 11 | PB20 | 0 | $\pi/4$ | PX4 | PX1 |
|  |  | PB21 | 1 |  | PX1 | PX4 |
| PA5 | 00 | PB30 | 0 | $\pi/2$ | PX8 | PX5 |
|  |  | PB31 | 1 |  | PX5 | PX8 |
| PA6 | 10 | PB40 | 0 | 0 | PX6 | PX5 |
|  |  | PB41 | 1 |  | PX5 | PX6 |
| PA7 | 01 | PB30 | 0 | $\pi/2$ | PX7 | PX6 |
|  |  | PB31 | 1 |  | PX6 | PX7 |
| PA8 | 11 | PB40 | 0 | 0 | PX7 | PX8 |
|  |  | PB41 | 1 |  | PX8 | PX7 |

FIG. 23

| FIRST MODULATION SIGNAL POINT | | SECOND MODULATION SIGNAL POINT | | | TRANSMISSION MODULATION SIGNAL POINT | |
|---|---|---|---|---|---|---|
| a(n) | FIRST DATA SEQUENCE | b(n) | SECOND DATA SEQUENCE | PHASE ROTATION | x(n)=a(n)+b(n) | x(N/2+n)=a(n)-b(n) |
| PA1 | 00 | PB11 | 0 | | PX1 | PX2 |
| | | PB10 | 1 | $3\pi/4$ | PX2 | PX1 |
| PA2 | 10 | PB21 | 0 | | PX2 | PX3 |
| | | PB20 | 1 | $-3\pi/4$ | PX3 | PX2 |
| PA3 | 01 | PB10 | 0 | | PX3 | PX4 |
| | | PB11 | 1 | $-\pi/4$ | PX4 | PX3 |
| PA4 | 11 | PB20 | 0 | | PX4 | PX1 |
| | | PB21 | 1 | $\pi/4$ | PX1 | PX4 |
| PA5 | 00 | PB30 | 0 | | PX8 | PX5 |
| | | PB31 | 1 | $\pi/2$ | PX5 | PX8 |
| PA6 | 10 | PB41 | 0 | | PX5 | PX6 |
| | | PB40 | 1 | $\pi$ | PX6 | PX5 |
| PA7 | 01 | PB31 | 0 | | PX6 | PX7 |
| | | PB30 | 1 | $-\pi/2$ | PX7 | PX6 |
| PA8 | 11 | PB40 | 0 | | PX7 | PX8 |
| | | PB41 | 1 | 0 | PX8 | PX7 |

FIG. 24

| FIRST MODULATION SIGNAL POINT | | SECOND MODULATION SIGNAL POINT | | | TRANSMISSION MODULATION SIGNAL POINT | |
|---|---|---|---|---|---|---|
| a(n) | FIRST DATA SEQUENCE | b(n) | SECOND DATA SEQUENCE | PHASE ROTATION | x(n)=a(n)+b(n) | x(N/2+n)=a(n)-b(n) |
| PA1 | 000 | PB10 | 0 | $-\pi/4$ | PX2 | PX1 |
|  |  | PB11 | 1 |  | PX1 | PX2 |
| PA2 | 011 | PB20 | 0 | $\pi/4$ | PX3 | PX2 |
|  |  | PB21 | 1 |  | PX2 | PX3 |
| PA3 | 110 | PB10 | 0 | $-\pi/4$ | PX3 | PX4 |
|  |  | PB11 | 1 |  | PX4 | PX3 |
| PA4 | 111 | PB20 | 0 | $\pi/4$ | PX4 | PX1 |
|  |  | PB21 | 1 |  | PX1 | PX4 |
| PA5 | 100 | PB30 | 0 | $\pi/2$ | PX8 | PX5 |
|  |  | PB31 | 1 |  | PX5 | PX8 |
| PA6 | 001 | PB40 | 0 | 0 | PX6 | PX5 |
|  |  | PB41 | 1 |  | PX5 | PX6 |
| PA7 | 010 | PB30 | 0 | $\pi/2$ | PX7 | PX6 |
|  |  | PB31 | 1 |  | PX6 | PX7 |
| PA8 | 101 | PB40 | 0 | 0 | PX7 | PX8 |
|  |  | PB41 | 1 |  | PX8 | PX7 |

FIG. 26

| FIRST MODULATION SIGNAL POINT | | SECOND MODULATION SIGNAL POINT | | | TRANSMISSION MODULATION SIGNAL POINT | |
|---|---|---|---|---|---|---|
| a(n) | FIRST DATA SEQUENCE | b(n) | SECOND DATA SEQUENCE | PHASE ROTATION | x(n)=a(n)+b(n) | x(N/2+n)=a(n)-b(n) |
| PA1 | 000 | PB11 | 0 | | PX1 | PX2 |
| | | PB10 | 1 | $3\pi/4$ | PX2 | PX1 |
| PA2 | 011 | PB21 | 0 | | PX2 | PX3 |
| | | PB20 | 1 | $-3\pi/4$ | PX3 | PX2 |
| PA3 | 110 | PB10 | 0 | | PX3 | PX4 |
| | | PB11 | 1 | $-\pi/4$ | PX4 | PX3 |
| PA4 | 111 | PB20 | 0 | | PX4 | PX1 |
| | | PB21 | 1 | $\pi/4$ | PX1 | PX4 |
| PA5 | 100 | PB30 | 0 | | PX8 | PX5 |
| | | PB31 | 1 | $\pi/2$ | PX5 | PX8 |
| PA6 | 001 | PB41 | 0 | | PX5 | PX6 |
| | | PB40 | 1 | $\pi$ | PX6 | PX5 |
| PA7 | 010 | PB31 | 0 | | PX6 | PX7 |
| | | PB30 | 1 | $-\pi/2$ | PX7 | PX6 |
| PA8 | 101 | PB40 | 0 | | PX7 | PX8 |
| | | PB41 | 1 | 0 | PX8 | PX7 |

FIG. 27

| FIRST MODULATION SIGNAL POINT | | SECOND MODULATION SIGNAL POINT | | | TRANSMISSION MODULATION SIGNAL POINT | |
|---|---|---|---|---|---|---|
| a(n) | FIRST DATA SEQUENCE | b(n) | SECOND DATA SEQUENCE | PHASE ROTATION | x(n)=a(n)+b(n) | x(N/2+n)=a(n)-b(n) |
| PA1 | 000 | PB10 | 0 | $-\pi/4$ | PX4 | PX1 |
|  |  | PB11 | 1 |  | PX1 | PX4 |
| PA2 | 011 | PB20 | 0 | $\pi/4$ | PX8 | PX5 |
|  |  | PB21 | 1 |  | PX5 | PX8 |
| PA3 | 110 | PB10 | 0 | $-\pi/4$ | PX9 | PX12 |
|  |  | PB11 | 1 |  | PX12 | PX9 |
| PA4 | 111 | PB20 | 0 | $\pi/4$ | PX13 | PX16 |
|  |  | PB21 | 1 |  | PX16 | PX13 |
| PA5 | 100 | PB30 | 0 | $\pi/2$ | PX15 | PX2 |
|  |  | PB31 | 1 |  | PX2 | PX15 |
| PA6 | 001 | PB40 | 0 | 0 | PX6 | PX3 |
|  |  | PB41 | 1 |  | PX3 | PX6 |
| PA7 | 010 | PB30 | 0 | $\pi/2$ | PX10 | PX7 |
|  |  | PB31 | 1 |  | PX7 | PX10 |
| PA8 | 101 | PB40 | 0 | 0 | PX11 | PX14 |
|  |  | PB41 | 1 |  | PX14 | PX11 |

FIG. 29

| FIRST MODULATION SIGNAL POINT | | SECOND MODULATION SIGNAL POINT | | | TRANSMISSION MODULATION SIGNAL POINT | FIRST MODULATION SIGNAL POINT |
|---|---|---|---|---|---|---|
| a(n) | FIRST DATA SEQUENCE | b(n) | SECOND DATA SEQUENCE | PHASE ROTATION | x(n)=a(n)+b(n) | x(N/2+n)=a(n)−b(n) |
| PA1 | 000 | PB11 | 0 | $3\pi/4$ | PX1 | PX4 |
|  |  | PB10 | 1 |  | PX4 | PX1 |
| PA2 | 011 | PB21 | 0 | $-3\pi/4$ | PX5 | PX8 |
|  |  | PB20 | 1 |  | PX8 | PX5 |
| PA3 | 110 | PB10 | 0 | $-\pi/4$ | PX9 | PX12 |
|  |  | PB11 | 1 |  | PX12 | PX9 |
| PA4 | 111 | PB20 | 0 | $\pi/4$ | PX13 | PX16 |
|  |  | PB21 | 1 |  | PX16 | PX13 |
| PA5 | 100 | PB30 | 0 | $\pi/2$ | PX15 | PX2 |
|  |  | PB31 | 1 |  | PX2 | PX15 |
| PA6 | 001 | PB41 | 0 | $\pi$ | PX3 | PX6 |
|  |  | PB40 | 1 |  | PX6 | PX3 |
| PA7 | 010 | PB31 | 0 | $\pi/2$ | PX7 | PX10 |
|  |  | PB30 | 1 |  | PX10 | PX7 |
| PA8 | 101 | PB40 | 0 | 0 | PX11 | PX14 |
|  |  | PB41 | 1 |  | PX14 | PX11 |

FIG. 30

| FIRST MODULATION SIGNAL POINT | | SECOND MODULATION SIGNAL POINT | | | TRANSMISSION MODULATION SIGNAL POINT | |
|---|---|---|---|---|---|---|
| a(n) | FIRST DATA SEQUENCE | b(n) | SECOND DATA SEQUENCE | PHASE ROTATION | x(n)=a(n)+b(n) | x(N/2+n)=a(n)-b(n) |
| PA1 | 0 | PB10 | 0 | | PX2 | PX1 |
| | | PB11 | 1 | $-\pi/4$ | PX1 | PX2 |
| PA3 | 1 | PB10 | 0 | | PX3 | PX4 |
| | | PB11 | 1 | $-\pi/4$ | PX4 | PX3 |
| PA2 | 0 | PB20 | 0 | | PX8 | PX5 |
| | | PB21 | 1 | $\pi/2$ | PX5 | PX8 |
| PA4 | 1 | PB20 | 0 | | PX7 | PX6 |
| | | PB21 | 1 | $\pi/2$ | PX6 | PX7 |

| FIRST MODULATION SIGNAL POINT | | SECOND MODULATION SIGNAL POINT | | | TRANSMISSION MODULATION SIGNAL POINT | |
|---|---|---|---|---|---|---|
| a(n) | FIRST DATA SEQUENCE | b(n) | SECOND DATA SEQUENCE | PHASE ROTATION | x(n)=a(n)+b(n) | x(N/2+n)=a(n)-b(n) |
| PA1 | 0 | PB11 | 0 | | PX1 | PX2 |
| | | PB10 | 1 | $3\pi/4$ | PX2 | PX1 |
| PA3 | 1 | PB10 | 0 | $-\pi/4$ | PX3 | PX4 |
| | | PB11 | 1 | | PX4 | PX3 |
| PA2 | 0 | PB20 | 0 | $\pi/2$ | PX8 | PX5 |
| | | PB21 | 1 | | PX5 | PX8 |
| PA4 | 1 | PB21 | 0 | $-\pi/2$ | PX6 | PX7 |
| | | PB20 | 1 | | PX7 | PX6 |

| FIRST MODULATION SIGNAL POINT | | | SECOND MODULATION SIGNAL POINT | | | TRANSMISSION MODULATION SIGNAL POINT | |
|---|---|---|---|---|---|---|---|
| a(n) | FIRST DATA SEQUENCE | | b(n) | SECOND DATA SEQUENCE | PHASE ROTATION | x(n)=a(n)+b(n) | x(N/2+n)=a(n)-b(n) |
| | 8PSK | QPSK | | | | | |
| PA1 | 000 | 00 | PB11 | 00 | 0 | PX9 | PX7 |
| | | | PB12 | 10 | | PX2 | PX16 |
| | | | PB13 | 01 | | PX7 | PX9 |
| | | | PB14 | 11 | | PX16 | PX2 |
| PA3 | 011 | 10 | PB11 | 00 | 0 | PX10 | PX4 |
| | | | PB12 | 10 | | PX11 | PX1 |
| | | | PB13 | 01 | | PX4 | PX10 |
| | | | PB14 | 11 | | PX1 | PX11 |
| PA5 | 110 | 01 | PB11 | 00 | 0 | PX3 | PX13 |
| | | | PB12 | 10 | | PX12 | PX6 |
| | | | PB13 | 01 | | PX13 | PX3 |
| | | | PB14 | 11 | | PX6 | PX12 |
| PA7 | 101 | 11 | PB11 | 00 | 0 | PX8 | PX14 |
| | | | PB12 | 10 | | PX5 | PX15 |
| | | | PB13 | 01 | | PX14 | PX8 |
| | | | PB14 | 11 | | PX15 | PX5 |
| PA2 | 001 | 00 | PB21 | 11 | $\pi/4$ | PX9 | PX3 |
| | | | PB22 | 00 | | PX10 | PX8 |
| | | | PB23 | 10 | | PX3 | PX9 |
| | | | PB24 | 01 | | PX8 | PX10 |
| PA4 | 010 | 10 | PB21 | 11 | $\pi/4$ | PX2 | PX12 |
| | | | PB22 | 00 | | PX11 | PX5 |
| | | | PB23 | 10 | | PX12 | PX2 |
| | | | PB24 | 01 | | PX5 | PX11 |
| PA6 | 111 | 01 | PB21 | 11 | $\pi/4$ | PX7 | PX13 |
| | | | PB22 | 00 | | PX4 | PX14 |
| | | | PB23 | 10 | | PX13 | PX7 |
| | | | PB24 | 01 | | PX14 | PX4 |
| PA8 | 100 | 11 | PB21 | 11 | $\pi/4$ | PX16 | PX6 |
| | | | PB22 | 00 | | PX1 | PX15 |
| | | | PB23 | 10 | | PX6 | PX16 |
| | | | PB24 | 01 | | PX15 | PX1 |

FIG. 35

| FIRST MODULATION SIGNAL POINT | | | SECOND MODULATION SIGNAL POINT | | | TRANSMISSION MODULATION SIGNAL POINT | |
|---|---|---|---|---|---|---|---|
| a(n) | FIRST DATA SEQUENCE | | b(n) | SECOND DATA SEQUENCE | PHASE ROTATION | x(n)=a(n)+b(n) | x(N/2+n)=a(n)-b(n) |
| | 8PSK | QPSK | | | | | |
| PA1 | 000 | 00 | PB11 | 00 | 0 | PX9 | PX7 |
| | | | PB12 | 10 | | PX2 | PX16 |
| | | | PB13 | 01 | | PX7 | PX9 |
| | | | PB14 | 11 | | PX16 | PX2 |
| PA3 | 011 | 10 | PB11 | 11 | π/2 | PX10 | PX4 |
| | | | PB12 | 00 | | PX11 | PX1 |
| | | | PB13 | 10 | | PX4 | PX10 |
| | | | PB14 | 01 | | PX1 | PX11 |
| PA5 | 110 | 01 | PB11 | 01 | π | PX3 | PX13 |
| | | | PB12 | 11 | | PX12 | PX6 |
| | | | PB13 | 00 | | PX13 | PX3 |
| | | | PB14 | 10 | | PX6 | PX12 |
| PA7 | 101 | 11 | PB11 | 10 | -π/2 | PX8 | PX14 |
| | | | PB12 | 01 | | PX5 | PX15 |
| | | | PB13 | 11 | | PX14 | PX8 |
| | | | PB14 | 00 | | PX15 | PX5 |
| PA2 | 001 | 00 | PB21 | 11 | π/4 | PX9 | PX3 |
| | | | PB22 | 00 | | PX10 | PX8 |
| | | | PB23 | 10 | | PX3 | PX9 |
| | | | PB24 | 01 | | PX8 | PX10 |
| PA4 | 010 | 10 | PB21 | 01 | 3π/4 | PX2 | PX12 |
| | | | PB22 | 11 | | PX11 | PX5 |
| | | | PB23 | 00 | | PX12 | PX2 |
| | | | PB24 | 10 | | PX5 | PX11 |
| PA6 | 111 | 01 | PB21 | 10 | -π/4 | PX7 | PX13 |
| | | | PB22 | 01 | | PX4 | PX14 |
| | | | PB23 | 11 | | PX13 | PX7 |
| | | | PB24 | 00 | | PX14 | PX4 |
| PA8 | 100 | 11 | PB21 | 00 | -π/4 | PX16 | PX6 |
| | | | PB22 | 10 | | PX1 | PX15 |
| | | | PB23 | 01 | | PX6 | PX16 |
| | | | PB24 | 11 | | PX15 | PX1 |

FIG. 36

| FIRST MODULATION SIGNAL POINT | | SECOND MODULATION SIGNAL POINT | | TRANSMISSION MODULATION SIGNAL POINT | |
|---|---|---|---|---|---|
| a(n) | FIRST DATA SEQUENCE | b(n) | c(n) | $x(n)=a(n)j^{c(n)}$ | $x(N/2+n)=a(n)j^{d(n)}$ |
| PX1 | 00 | 1 | 0 | PX1 | PX2 |
|  |  | 0 | 1 | PX2 | PX1 |
| PX2 | 10 | 1 | 0 | PX2 | PX3 |
|  |  | 0 | 1 | PX3 | PX2 |
| PX3 | 01 | 0 | 0 | PX3 | PX4 |
|  |  | 1 | 1 | PX4 | PX3 |
| PX4 | 11 | 0 | 0 | PX4 | PX1 |
|  |  | 1 | 1 | PX1 | PX4 |
| PX8 | 00 | 0 | 0 | PX8 | PX5 |
|  |  | 1 | 1 | PX5 | PX8 |
| PX5 | 10 | 1 | 0 | PX5 | PX6 |
|  |  | 0 | 1 | PX6 | PX5 |
| PX6 | 01 | 1 | 0 | PX6 | PX7 |
|  |  | 0 | 1 | PX7 | PX6 |
| PX7 | 11 | 0 | 0 | PX7 | PX8 |
|  |  | 1 | 1 | PX8 | PX7 |

FIG. 37

| FIRST MODULATION SIGNAL POINT | | SECOND MODULATION SIGNAL POINT | | TRANSMISSION MODULATION SIGNAL POINT | |
|---|---|---|---|---|---|
| $a(n)$ | FIRST DATA SEQUENCE | $b(n)$ | $c(n)$ | $x(n)=a(n)j^{c(n)}$ | $x(N/2+n)=a(n)j^{d(n)}$ |
| PX1 | 00 | 0 | 0 | PX1 | PX2 |
|  |  | 1 | 1 | PX2 | PX1 |
| PX2 | 10 | 0 | 0 | PX2 | PX3 |
|  |  | 1 | 1 | PX3 | PX2 |
| PX3 | 01 | 0 | 0 | PX3 | PX4 |
|  |  | 1 | 1 | PX4 | PX3 |
| PX4 | 11 | 0 | 0 | PX4 | PX1 |
|  |  | 1 | 1 | PX1 | PX4 |
| PX8 | 00 | 0 | 0 | PX8 | PX5 |
|  |  | 1 | 1 | PX5 | PX8 |
| PX5 | 10 | 0 | 0 | PX5 | PX6 |
|  |  | 1 | 1 | PX6 | PX5 |
| PX6 | 01 | 0 | 0 | PX6 | PX7 |
|  |  | 1 | 1 | PX7 | PX6 |
| PX7 | 11 | 0 | 0 | PX7 | PX8 |
|  |  | 1 | 1 | PX8 | PX7 |

FIG. 38

ND RECEIVER

CROSS REFERENCE TO RELATED APPLICATIONS

This application is based upon and claims the benefit of priority from the prior Japanese Patent Applications No. 2007-223149, filed on Aug. 29, 2007; the entire contents of which are incorporated herein by reference.

BACKGROUND OF THE INVENTION

1. Field of the Invention

The present invention relates to a transmitter and a receiver for single-carrier signals, and more particularly, to a transmission method and reception method for multiplexed data.

2. Related Art

Among single carrier schemes, there is an IFDMA (interleaved FDMA) scheme whereby a data sequence is repeated in a specific pattern to generate a single carrier signal composed of frequency components (subcarriers) arranged at certain intervals (see "interleaved FDMA—A New Spread-Spectrum Multiple—Access Scheme", Proc of ICC'98, Jun. 1998).

According to the above described IFDMA scheme, when a plurality of data sequences are multiplexed and transmitted by simultaneously using a plurality of channels (e.g., even-numbered channel made up of even-numbered frequency components and odd-numbered channel made up of odd-numbered frequency components), there is a problem that signal points of a transmission signal are no longer specific signal points such as QPSK and 8PSK and peak power of the transmission signal increases.

SUMMARY OF THE INVENTION

According to an aspect of the present invention, there is provided with a transmitter comprising:

a pilot generation unit configured to generate a plurality of pilot symbols;

a bit sequence generation unit configured to invert each bit in a first bit sequence to generate a second bit sequence;

a transmission block generation unit configured to generate a transmission block by giving phase rotation determined according a value of each of bits in the first and second bit sequence to each of the pilot symbols corresponding to each of the bits; and a transmission unit configured to transmit the transmission block.

According to an aspect of the present invention, there is provided with a first modulation unit configured to modulate a first bit sequence to generate a plurality of first modulation symbols;

a signal point set selection unit configured to select a signal point set according to a value of each of the first modulation symbols from a plurality of signal point sets in a relationship of being rotated centered on an origin on an IQ plane;

a second modulation unit configured to modulate each of bits in a second bit sequence using the signal point selected for each of the first modulation symbols corresponding to each of the bits in the second bit sequence to generate a same number of second modulation symbols as the first modulation symbols;

a transmission block generation unit configured to generate a transmission block including transmission symbols two times as many as the first modulation symbols by carrying out addition processing and subtraction processing between each of the first modulation symbols and each of the second modulation symbols corresponding to each of the first modulation symbols; and a transmission unit configured to transmit the transmission block.

According to an aspect of the present invention, there is provided with a transmitter comprising:

a pilot generation unit configured to generate a plurality of pilot symbols;

a signal point set selection unit configured to select a signal point set according to a value of each of the pilot symbols from a plurality of signal point sets in a relationship of being rotated centered on an origin on an IQ plane;

a second modulation unit configured to modulate each of bits in a second bit sequence using the signal point set selected for each of the pilot symbols corresponding to each of the bits in the second bit sequence to generate a same number of second modulation symbols as the pilot symbols;

a transmission block generation unit configured to generate a transmission block including transmission symbols two times as many as the pilot symbols by carrying out addition processing and subtraction processing between each of the pilot symbols and each of the second modulation symbols corresponding to each of the first modulation symbols; and a transmission unit configured to transmit the transmission block.

According to an aspect of the present invention, there is provided with a transmitter comprising:

a pilot generation unit configured to generate a plurality of pilot symbols;

a bit sequence reception unit configured to receive a second bit sequence made up of a same number of bits as the pilot symbols;

a bit inversion unit configured to invert each of bits in the second bit sequence according to a signal point of each of the pilot symbols corresponding to each of the bits in the second bit sequence to obtain an inverted second bit sequence;

a first block generation unit configured to generate a first block including doubled pilot symbols by repeating the pilot symbols or generate a first block including the pilot symbols and sign-inverted pilot symbols that signs of the pilot symbols are inverted;

a second block generation unit configured to generate a third bit sequence by inverting each bit of the inverted second bit sequence and generate a second block by combining the inverted bit sequence and the third bit sequence each other;

a transmission block generation unit configured to generate a transmission block by giving phase rotation determined according to a value of each of bits in the second block to each of the pilot symbols in the first block corresponding to each of the bits in the second block; and a transmission unit configured to transmit the transmission block, wherein each of the pilot symbols in the first block corresponds to any one of signal points of MPSK modulation, and phase rotation given to each of the pilot symbols in the first block is such phase rotation that each of the pilot symbols becomes any one of signal points of MPSK modulation again.

According to an aspect of the present invention, there is provided with a receiver comprising:

a Fourier transform unit configured to Fourier-transform a received signal to decompose the received signal into a plurality of frequency components;

a separation unit configured to separate the frequency components into first received frequency data made up of every other first frequency components and second received frequency data made up of every other second frequency components which are different from the respective first frequency components;

a first inverse Fourier transform unit configured to inverse-Fourier-transform the first received frequency data to obtain a first symbol sequence including a plurality of first received symbols;

a second inverse Fourier transform unit configured to inverse-Fourier-transform the second received frequency data to obtain a second symbol sequence including a same number of second received symbols as the first received symbols;

a first demodulation unit configured to demodulate each of the first received symbols included in the first symbol sequence;

a phase correction unit configured to add phase rotation determined according to a position in the second symbol sequence to each of the second received symbols;

a signal point set selection unit configured to select a signal point set according to a value of each of the first received symbol from a plurality of signal point sets in a relationship of being rotated centered on an origin on an IQ plane; and a second demodulation unit configured to demodulate each of phase-rotated second received symbols based on a signal point set selected for each of the first received symbol corresponding to each of the phase-rotated second received symbols.

BRIEF DESCRIPTION OF THE DRAWINGS

FIG. 9 shows the correspondence between subcarrier numbers and frequency data according to the embodiment of the present invention;

FIG. 20 provides a summary of an example of relationship between a first bit sequence, second bit sequence and transmission modulation signal point of a first configuration example of transmission modulation signal points according to the embodiment of the present invention;

FIG. 21 provides a summary of another example of relationship between a first bit sequence, second bit sequence and transmission modulation signal point of a first configuration example of transmission modulation signal points according to the embodiment of the present invention;

FIG. 23 provides a summary of an example of relationship between a first bit sequence, second bit sequence and transmission modulation signal point of a second configuration example of transmission modulation signal points according to the embodiment of the present invention;

FIG. 24 provides a summary of another example of relationship between a first bit sequence, second bit sequence and transmission modulation signal point of a second configuration example of transmission modulation signal points according to the embodiment of the present invention;

FIG. 26 provides a summary of an example of relationship between a first bit sequence, second bit sequence and transmission modulation signal point of a third configuration example of transmission modulation signal points according to the embodiment of the present invention;

FIG. 27 provides a summary of another example of relationship between a first bit sequence, second bit sequence and transmission modulation signal point of a third configuration example of transmission modulation signal points according to the embodiment of the present invention;

FIG. 29 provides a summary of an example of relationship between a first bit sequence, second bit sequence and transmission modulation signal point of a fourth configuration example of transmission modulation signal points according to the embodiment of the present invention;

FIG. 30 provides a summary of another example of relationship between a first bit sequence, second bit sequence and transmission modulation signal point of a fourth configuration example of transmission modulation signal points according to the embodiment of the present invention;

FIG. 32 provides a summary of an example of relationship between a first bit sequence, second bit sequence and transmission modulation signal point of a fifth configuration example of transmission modulation signal points according to the embodiment of the present invention;

FIG. 33 provides a summary of another example of relationship between a first bit sequence, second bit sequence and transmission modulation signal point of a fifth configuration example of transmission modulation signal points according to the embodiment of the present invention;

FIG. 35 provides a summary of an example of relationship between a first bit sequence, second bit sequence and transmission modulation signal point of a sixth configuration example of transmission modulation signal points according to the embodiment of the present invention;

FIG. 36 provides a summary of another example of relationship between a first bit sequence, second bit sequence and transmission modulation signal point of a sixth configuration example of transmission modulation signal points according to the embodiment of the present invention;

FIG. 37 provides a summary of an example of relationship between a first bit sequence, second bit sequence and transmission modulation signal point of an eighth configuration example of transmission modulation signal points according to the embodiment of the present invention;

FIG. 38 provides a summary of another example of relationship between a first bit sequence, second bit sequence and transmission modulation signal point of an eighth configuration example of transmission modulation signal points according to the embodiment of the present invention;

DETAILED DESCRIPTION OF THE INVENTION

With reference now to the attached drawings, embodiments of the present invention will be explained in detail below.

Figure 1:
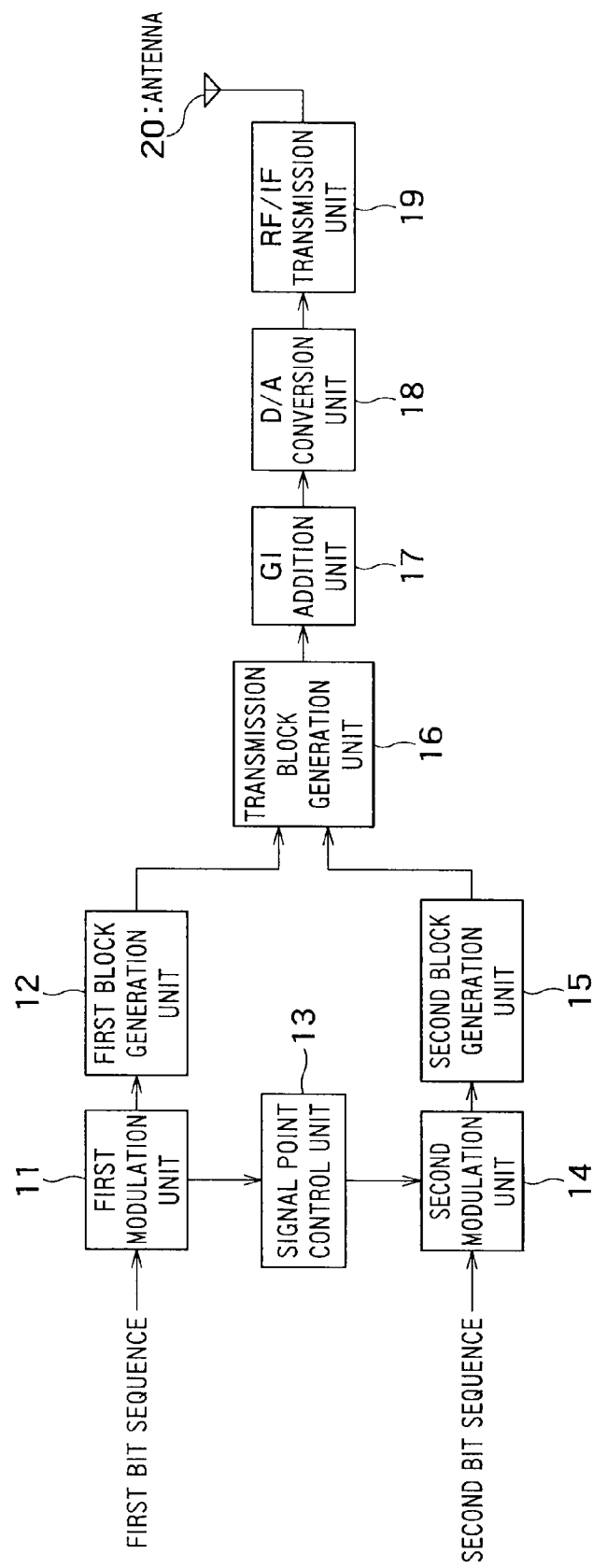
FIG. 1 shows a first configuration example of a transmitter according to an embodiment of the present invention.

FIG. 1 shows a first configuration example of a transmitter according to the embodiment of the present invention. More specifically, FIG. 1 shows a first configuration example of a transmitter to multiplex and transmit two data sequences of a first bit sequence and a second bit sequence and transmit the transmission signal in a single carrier signal format.

The first bit sequence is subjected to data modulation at a first modulation unit 11 according to a first modulation method and outputted as a plurality of first modulation symbols. A first block generation unit 12 collects N/2 first modulation symbols and generates and outputs a first block.

The second bit sequence is subjected to data modulation at a second modulation unit 14 according to a second modulation method and outputted as a plurality of second modulation symbols as many as the first modulation symbols. However, second modulation signal points which are signal points used by the second modulation unit 14 change depending on first modulation signal points which are signal points used by the first modulation symbols in the first block and are controlled by a signal point control unit (signal point selection unit) 13. The present invention adjusts signal points of finally transmitted symbols (symbols generated by a transmission block generation unit 16) through the operation of the signal point control unit 13 and thereby generates a single carrier signal with suppressed peak power. The signal point control unit 13 selects a signal point set according to the value of the first modulation symbol for each first modulation symbol from a plurality of signal point sets in a relationship of being rotated centered on the origin on the IQ plane and specifies the selected signal point set for the second modulation unit 14 so as to be used to modulate bits corresponding to the first modulation symbols. Details of the operation of the signal point set selection unit will be described later. As in the case of the first block generation unit 12, the second block generation unit 15 collects N/2 second modulation symbols outputted from the second modulation unit 14, and generates and outputs a second block.

Figure 2:
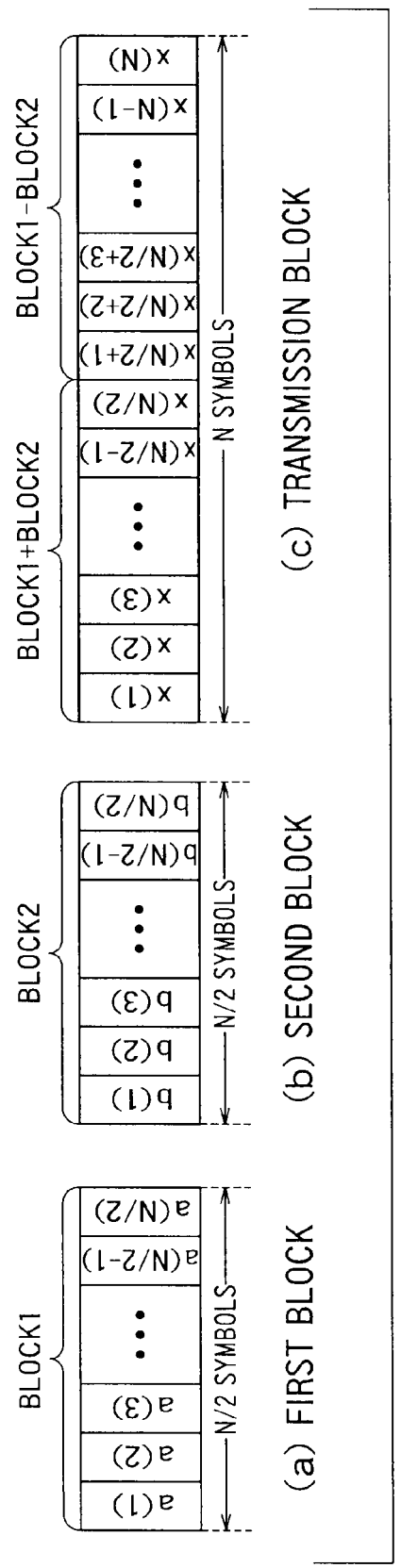
FIG. 2 illustrates the operation of a transmission block generation unit 16 according to the embodiment of the present invention.

The transmission block generation unit (transmission block generation unit) 16 carries out an addition and subtraction between the first block and second block, generates and outputs a transmission block made up of N symbols. FIG. 2 illustrates the operation of the transmission block generation unit 16. As shown in FIG. 2(a), the first block is made up of N/2 first modulation symbols a(1) to a(N/2), and as shown in FIG. 2(b), the second block is made up of N/2 second modulation symbols b(1) to b(N/2). In this case, transmission symbols in the transmission block are generated as the sum of the first block and second block for the first half part x(1) to x(N/2), that is, x(n)=a(n)+b(n) and as the difference between the first block and second block for the latter half part x(N/2+1) to x(N), that is, x(N/2+n)=a(n)−b(n) as shown in FIG. 2(c). In this way, the first block of the same sign is repeated (two sets of "a(1) to a(N/2)" are arranged side by side) and the second blocks of opposite signs are repeated ("b(1) to b(N/2)" and "−b(1) to −b(N/2)" are arranged side by side) so that after Fourier transform processing in the receiver, the first block has only even-numbered frequency components and the second block has only odd-numbered frequency component. That is, if the block of N symbols of "a(1), a(2), a(3) . . . a(N/2), a(1), a(2), a(3) . . . a(N2)" (suppose block A) is transmitted, this block has only even-numbered frequency components after Fourier transform processing at the receiver. Likewise, if a block of N symbols "b(1), b(2), b(3) . . . b(N/2), −b(1), −b(2), −b(3) . . . −b(N2)" (block B) is transmitted, this block has only odd-numbered frequency components after Fourier transform processing at the receiver. Therefore, when a block of N symbols "a(1)+b(1), a(2)+b(2), a(3)+b(3) . . . a(N/2)+b(N/2), a(1)−b(1), a(2)−b(2), a(3)−b(3) . . . a(N2)−b(N2)" obtained by adding up these block A and block B is transmitted, block A is obtained with even-numbered frequency components and block B is obtained with odd-numbered frequency components at the receiver after Fourier transform. One of features of the present invention is to operate the signal point control unit 13 so that transmission symbol x(n) in a transmission block becomes a specific signal point in a widely used modulation scheme such as QPSK and 8PSK.

Figure 3:
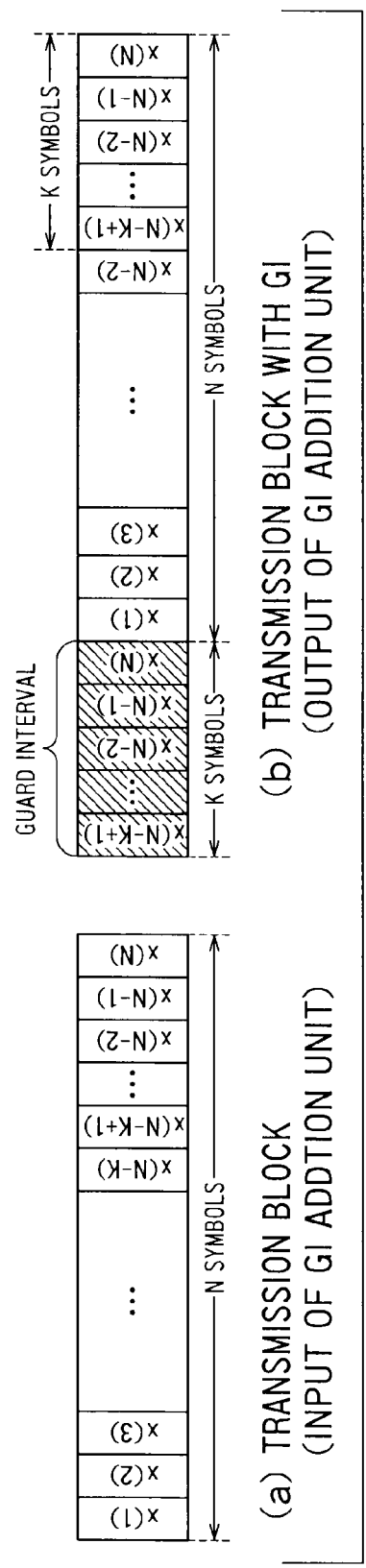
FIG. 3 illustrates the operation of a GI addition unit 17 according to the embodiment of the present invention.

Next, a GI addition unit 17 adds a guard interval (GI) to transmission blocks for the purpose of reducing interference due to multipath in communication paths. In the case of a transmission block shown in FIG. 3(*a*), K symbols at the end of the transmission block are added at the head of the transmission block as a guard interval as shown in FIG. 3(*b*). The guard interval that extends the transmission block so as to be cyclically repeated is also called a "cyclic prefix."

The transmission block with the GI added is converted from a digital signal to an analog signal at a D/A conversion unit 18, converted to a radio signal at an RF/IF transmission unit 19 and transmitted from an antenna 20.

Figure 4:
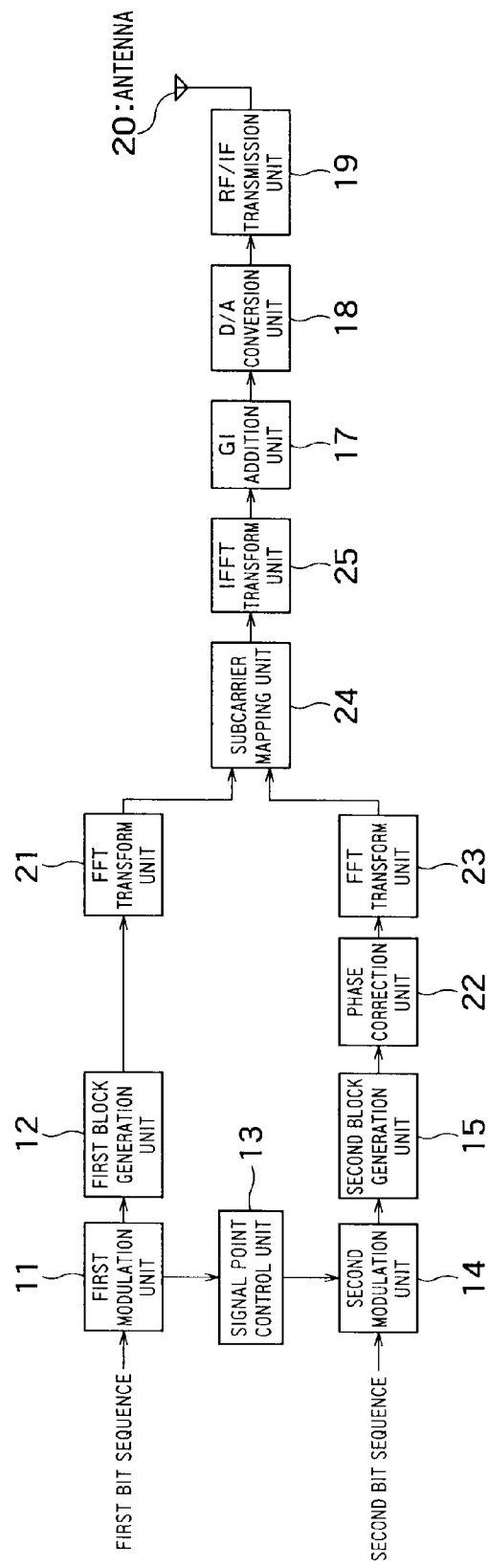
FIG. 4 shows a second configuration example of the transmitter according to the embodiment of the present invention.

FIG. 4 shows a second configuration example of the transmitter according to the embodiment of the present invention. While the first configuration example of the transmitter shown in FIG. 1 has a configuration to generate a transmission block through signal processing in the time domain, the second configuration example of the transmitter in FIG. 4 has a configuration to generate a transmission block through signal processing in the frequency domain.

In FIG. 4, the operations until a first block generation unit 12 and a second block generation unit 15 output a first block and a second block respectively are the same as the operations in the first configuration example in FIG. 1, and therefore explanations thereof will be omitted here.

Figure 5:
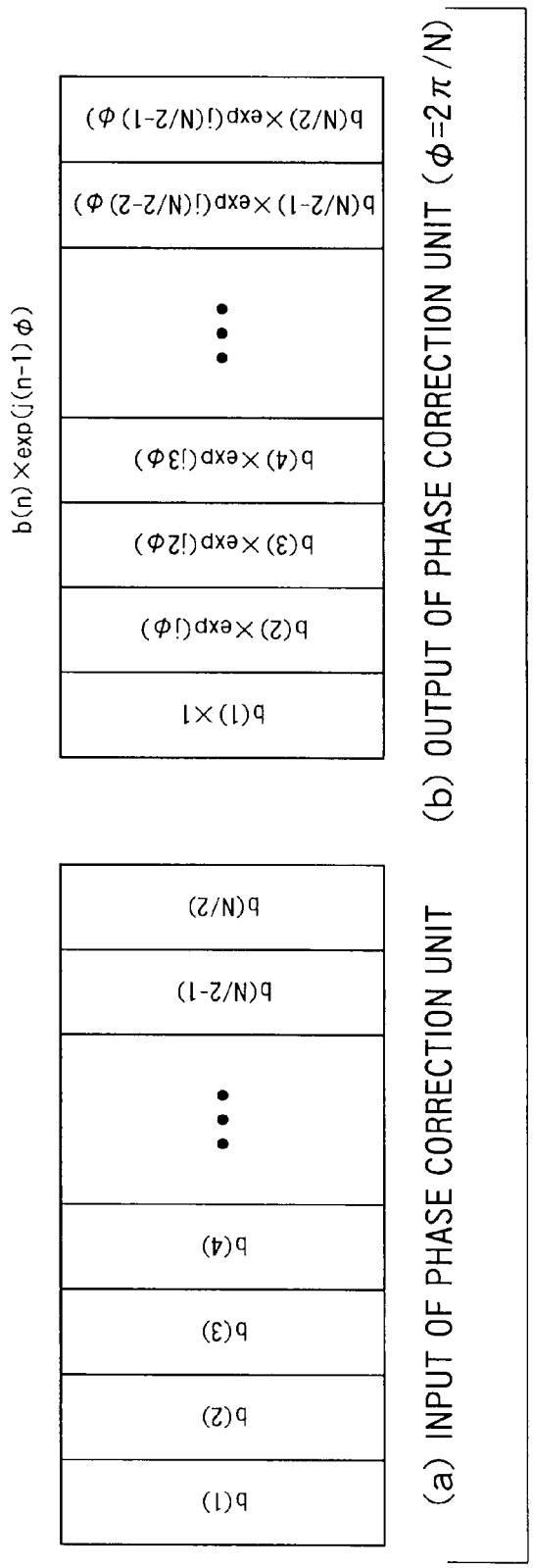
FIG. 5 illustrates the operation of a phase correction unit according to the embodiment of the present invention.

A phase correction unit 22 multiplies b(n) which is an nth (n=1, 2, ..., N/2) element of a second block by phase rotation exp(j(n−1)φ). Here, φ=2n/N. The input and output of the phase correction unit 22 are shown in FIG. 5(*a*) and FIG. 5(*b*). The reason that the second block is multiplied by such phase rotation is to cancel out phase rotation produced when the second block is converted to a frequency domain, mapped to odd-numbered subcarriers and then restored to a time domain.

Figure 6:
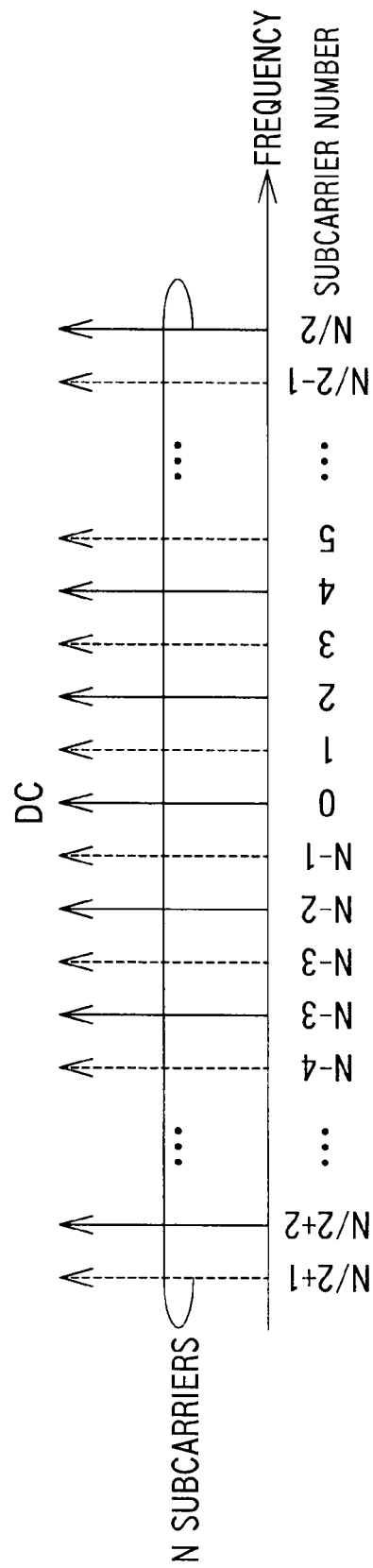
FIG. 6 illustrates subcarriers used for the transmitter according to the embodiment of the present invention.

Next, FFT transform units (first Fourier transform unit and second Fourier transform unit) 21 and 23 perform Fourier transform (Fast Fourier Transform) processing in size N/2 on the first block and the second block subjected to phase rotation at the phase correction unit 22 and the blocks are transformed into a first frequency block (first frequency data) and a second frequency block (second frequency data) which are frequency domain data in size N/2 respectively. A subcarrier mapping unit 24 maps the respective elements of the first frequency block and the second frequency block to N mutually orthogonal subcarriers as shown in FIG. 6. The N subcarriers are numbered such that DC components are even-numbered. An even-numbered subcarrier or odd-numbered subcarrier is every other first subcarrier out of the N subcarriers and an odd-numbered subcarrier or even-numbered subcarrier corresponds to every other second subcarrier which is different from each first subcarrier.

Figure 7:
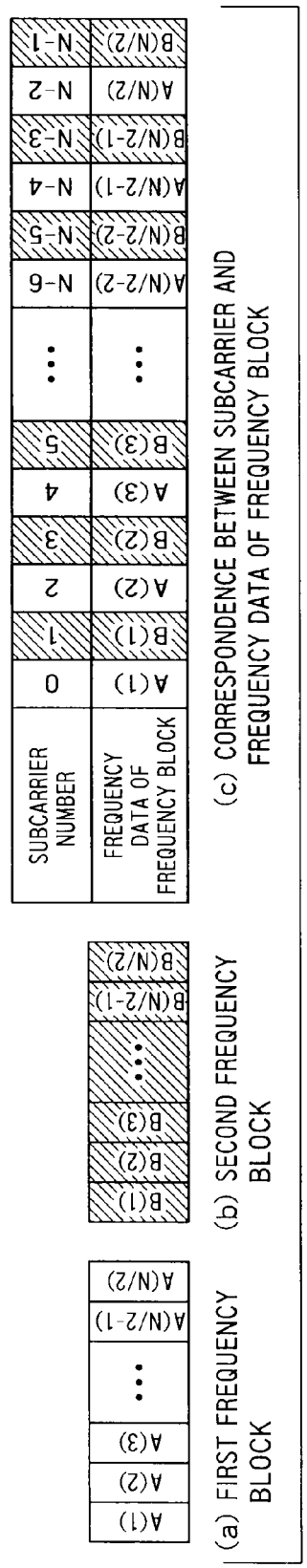
FIG. 7 illustrates the operation of a subcarrier mapping unit according to the embodiment of the present invention.

FIG. 7 shows a method of mapping the first frequency block and the second frequency block to subcarriers in subcarrier mapping. FIG. 7(*a*) shows the first frequency block and FIG. 7(*b*) shows the second frequency block. As shown in FIG. 7(*c*), elements A(1) to A(N/2) of the first frequency block are sequentially mapped to even-numbered subcarriers and elements B(1) to B(N/2) of the second frequency block are sequentially mapped to odd-numbered subcarriers.

An IFFT transform unit (inverse Fourier transform unit) 25 re-transforms the frequency data mapped to the N subcarriers into time domain data through inverse Fourier transform (Inverse Fast Fourier Transform) processing. If the IFFT size at the IFFT transform unit 25 is N, the output of the IFFT transform unit 25 becomes the same as that of the transmission block in the first configuration example shown in FIG. 2(*c*). Due to filter processing (not shown) at the digital unit or analog unit, a value larger than the size N of data mapping is generally used as the actual IFFT size, but this is not any point at issue of the present invention, and therefore suppose the IFFT size is a minimum necessary size (N in this case) unless otherwise specified for ease of explanation. Since the operations from a GI addition unit 17 onward in FIG. 4 are essentially the same as the operations shown in FIG. 1, explanations thereof will be omitted.

Figure 8:
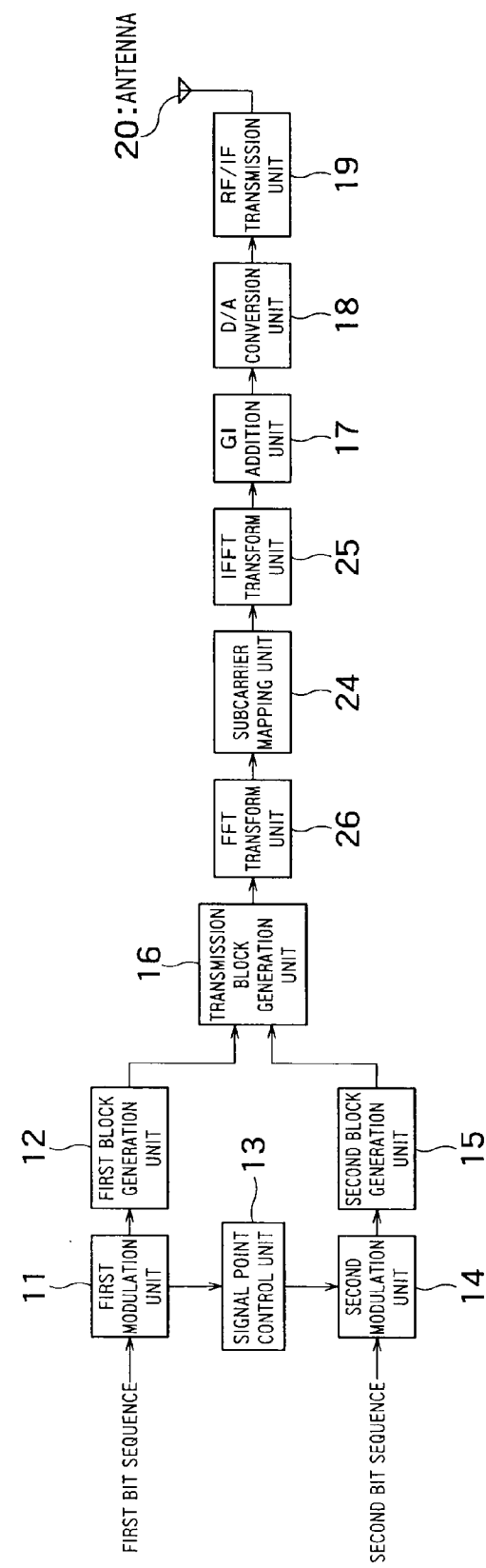
FIG. 8 shows a third configuration example of the transmitter according to the embodiment of the present invention transmitter.

FIG. 8 shows a third configuration example of the transmitter according to the embodiment of the present invention. In FIG. 8, the operations of up to a transmission block generation unit 16 are the same as those of the first configuration example of the transmitter in FIG. 1 and the output of the transmission block generation unit 16 in FIG. 8 is also similar to that shown in FIG. 2(*c*). In the third configuration example, a transmission block is transformed into frequency domain data through Fourier transform processing at an FFT transform unit (Fourier transform unit) 26, the frequency domain data is mapped to subcarriers at a subcarrier mapping unit 24 and the mapped data is re-transformed into time domain data through inverse Fourier transform processing at an IFFT transform unit 25.

FIG. 9 shows the correspondence between frequency data X(1) to X(N) of the output of the FFT transform unit 26 and the subcarriers shown in FIG. 6 at the subcarrier mapping unit 24. The IFFT transform unit 25 re-transforms the frequency data mapped to the N subcarriers into time domain data through inverse Fourier transform processing. Since the subsequent operations are the same as those in the first and second configuration examples shown in FIG. 1 and FIG. 4, explanations thereof will be omitted. Furthermore, the output of the IFFT transform unit 25 is equivalent to that of the transmission block shown in FIG. 2(*c*).

Figure 10:
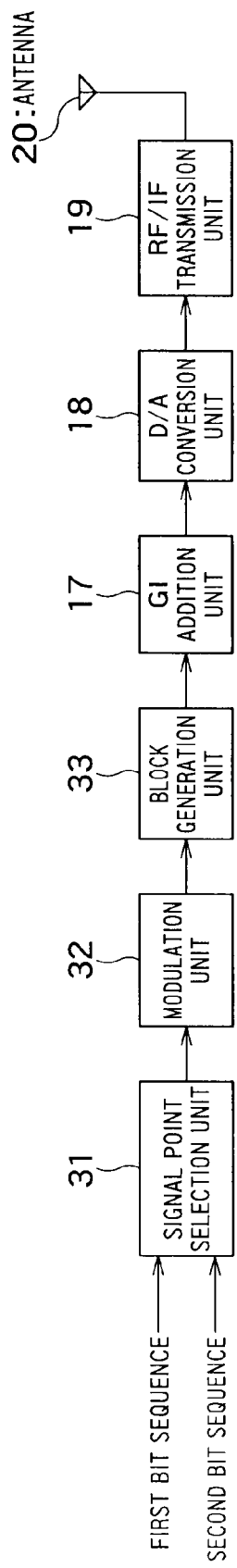
FIG. 10 shows a fourth configuration example of the transmitter according to the embodiment of the present invention.

FIG. 10 shows a fourth configuration example of the transmitter according to the embodiment of the present invention. In the first to third configuration examples of the transmitter shown in FIG. 1, FIG. 4 and FIG. 8, two blocks of the first block and second block are generated and then the output of the transmission block or IFFT transform unit corresponding thereto is generated. The fourth configuration example of the transmitter is different in that a transmission block is directly generated from a first bit sequence and a second bit sequence.

As shown in FIG. 2, each element x(n) of the transmission block is generated by an addition or subtraction between a(n) and b(n). Here, a set of modulation signal points used by the first modulation unit 11 is defined as a "first modulation signal point set" and a set of modulation signal points used by the second modulation unit 14 is defined as a "second modulation signal point set." That is, {a(n)∈first modulation signal point set} and {b(n)∈second modulation signal point set}. Furthermore, when a set of signal points of x(n) is defined as a "transmission modulation signal point set," that is, {x(n) ∈transmission modulation signal point set}, there is a relationship between the transmission modulation signal point set=first modulation signal point set±second modulation signal point set. However, as will be described later, the present invention has a feature that a second modulation signal point of b(n) varies depending on the value of a(n).

In FIG. 10, a signal point selection unit 31 directly selects a signal point corresponding to x(n) from the first bit sequence and the second bit sequence from the transmission modulation signal point set and a modulation unit 32 outputs a symbol corresponding to the selected signal point. Since signal points x(n) and x(N/2+n) have a relationship of a kind of pair such as a(n)+b(n), x(N/2+n) is also automatically determined when x(n) is determined. A block generation unit 33 collects N symbols x(1) to x(N) outputted from the modulation unit 32, generates and outputs a transmission block as shown in FIG. 2(*c*). A set of the modulation unit 32 and the block generation unit 33 form, for example, a transmission block generation unit.

In this way, the signal point selection unit 31 includes a signal point set storage that stores a signal point set which defines signal points obtained by performing addition processing and subtraction processing between first modulation symbols obtained by applying first modulation to first bit data (e.g., a(n)) and second modulation symbols obtained by applying second modulation to second bit data (e.g., b(n)) according to a combination of the first bit data and second bit data, and a reception unit that receives a first bit sequence including a plurality of pieces of first bit data and a second bit sequence including as many pieces of second bit data as the first bit data included in the first bit sequence. The signal point selection unit 31 selects signal points corresponding to the addition and subtraction between the first bit data and second bit data for each set of mutually corresponding first bit data and second bit data from the signal point set in the signal point set storage. The transmission block generation unit (modulation unit 32 and block generation unit 33) generates transmission symbols corresponding to the selected signal points for each set by the signal point selection unit 31 and generates a transmission block including the transmission symbols obtained from each set.

The operations from a GI addition unit 17 onward in FIG. 10 are the same as those in FIG. 1, and therefore explanations thereof will be omitted.

Figure 11:
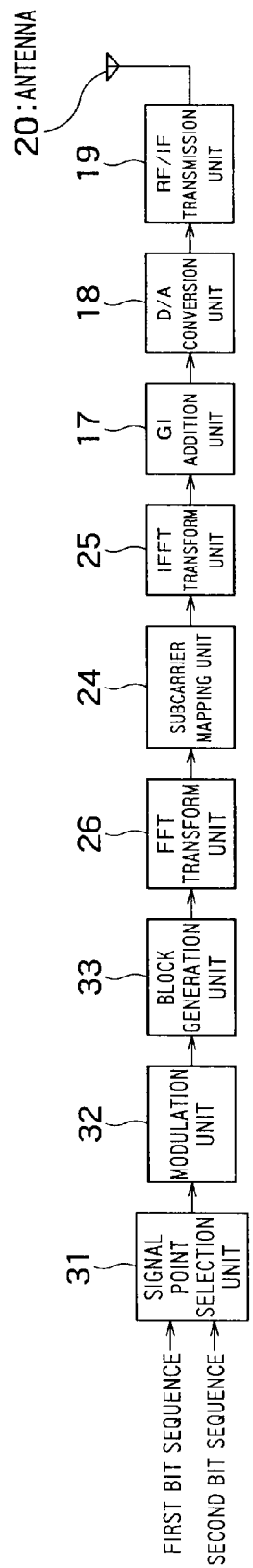
FIG. 11 shows a fifth configuration example of the transmitter according to the embodiment of the present invention.

FIG. 11 shows a fifth configuration example of the transmitter according to the embodiment of the present invention. The components up to a block generation unit 33 are the same as those in the fourth configuration example shown in FIG. 10. A difference from FIG. 10 is that a transmission block is transformed into a frequency domain by an FFT transform unit (Fourier transform unit) 26, the frequency domain data is mapped to subcarriers by a subcarrier mapping unit 24, and then the mapped data is re-transformed into a time domain by an IFFT transform unit (inverse Fourier transform unit) 25 and transmitted. That is, the operations from the FFT transform unit 26 onward are the same as those of the third configuration example shown in FIG. 8.

Figure 12:
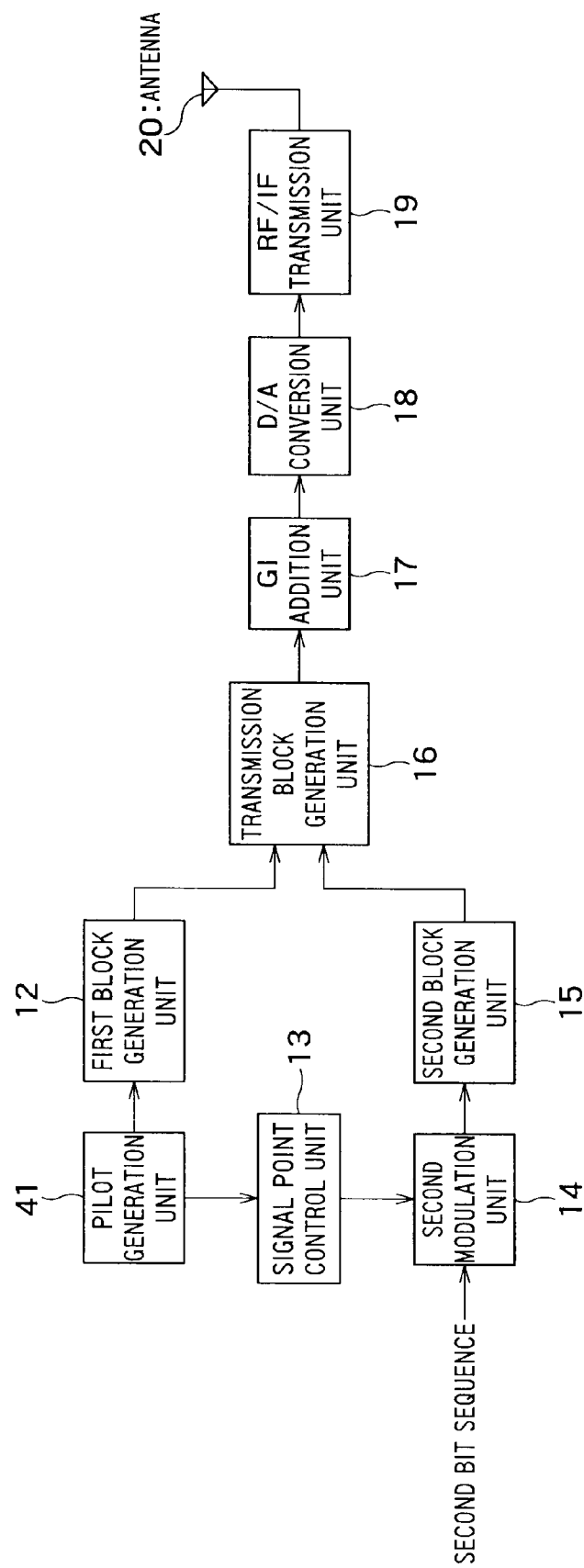
FIG. 12 shows a sixth configuration example of the transmitter according to the embodiment of the present invention.

FIG. 12 shows a sixth configuration example of the transmitter according to the embodiment of the present invention. A difference from the first configuration example shown in FIG. 1 is only that the first bit sequence and first modulation unit 11 are replaced by a pilot generation unit 41. That is, if modulation symbols a(n)(n=1, 2 . . . , N/2) of the output of the first modulation unit 11 are regarded as fixed pilot symbols, the sixth configuration example is equivalent to the first configuration example (FIG. 1). However, in the case of pilot symbols, this embodiment is different in that a(n) is known to the receiver without the necessity for demodulation as will be described later. Other aspects are the same as those in the first configuration example in FIG. 1, and therefore explanations thereof will be omitted.

Figure 13:
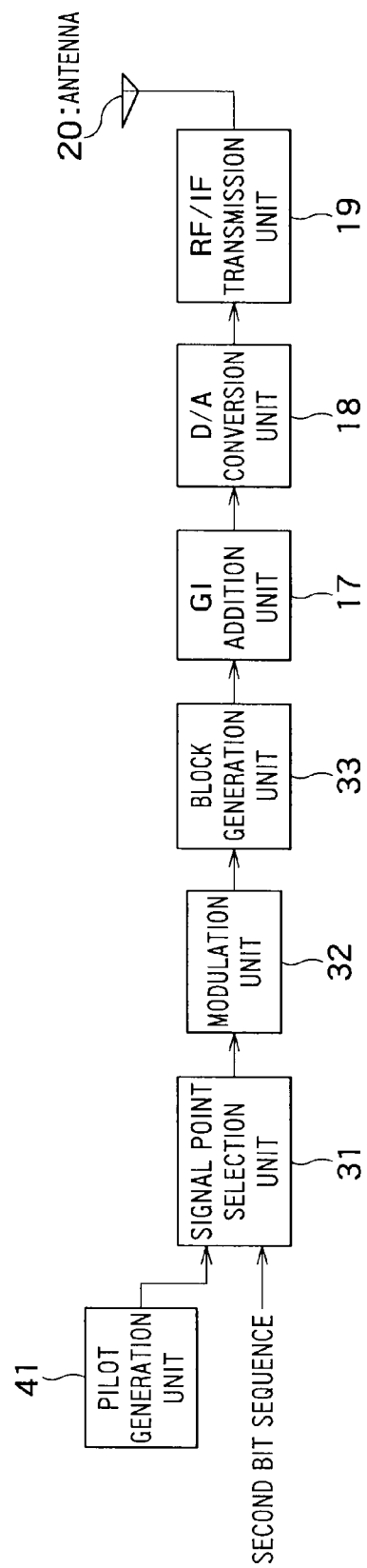
FIG. 13 shows a seventh configuration example of the transmitter according to the embodiment of the present invention.

FIG. 13 shows a seventh configuration example of the transmitter according to the embodiment of the present invention. This embodiment is different from the fourth configuration example shown in FIG. 10 only in that the fourth embodiment in which the signal point selection unit 31 selects signal points from the first bit sequence and the second bit sequence is changed in this embodiment so that signal points are selected from pilot symbols generated by a pilot generation unit 41 and the second bit sequence.

It is obvious that the configuration of transmitting pilot symbols instead of the first bit sequence can also be realized for the second, third, fifth configuration examples of the transmitter shown in FIG. 4, FIG. 8 and FIG. 11 in the same way as in FIG. 12 or FIG. 13.

Figure 14:
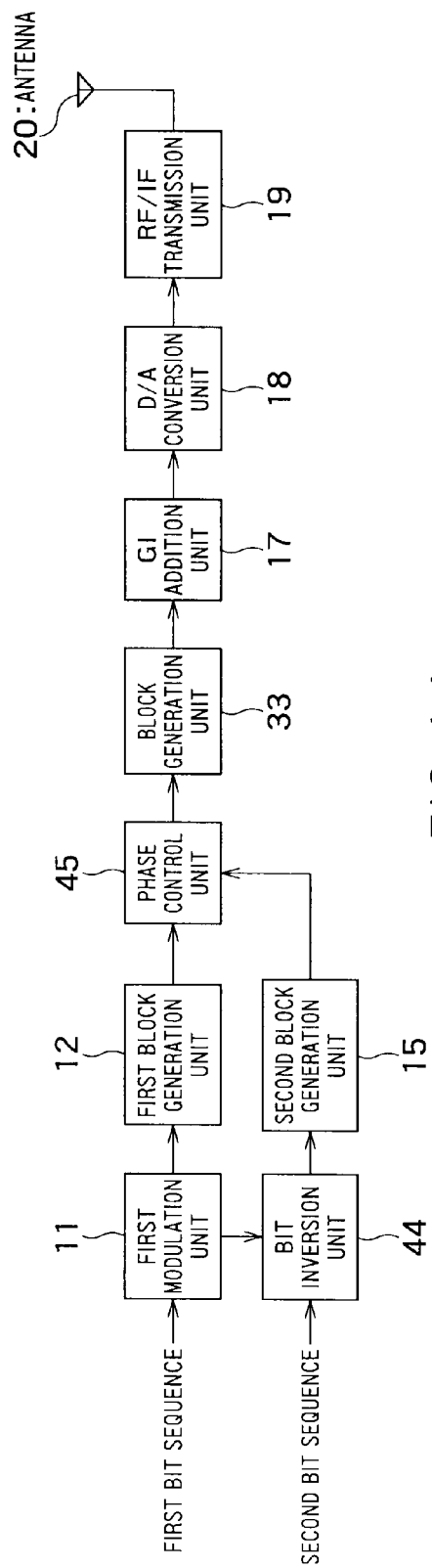
FIG. 14 shows an eighth configuration example of the transmitter according to the embodiment of the present invention.
Figure 15:
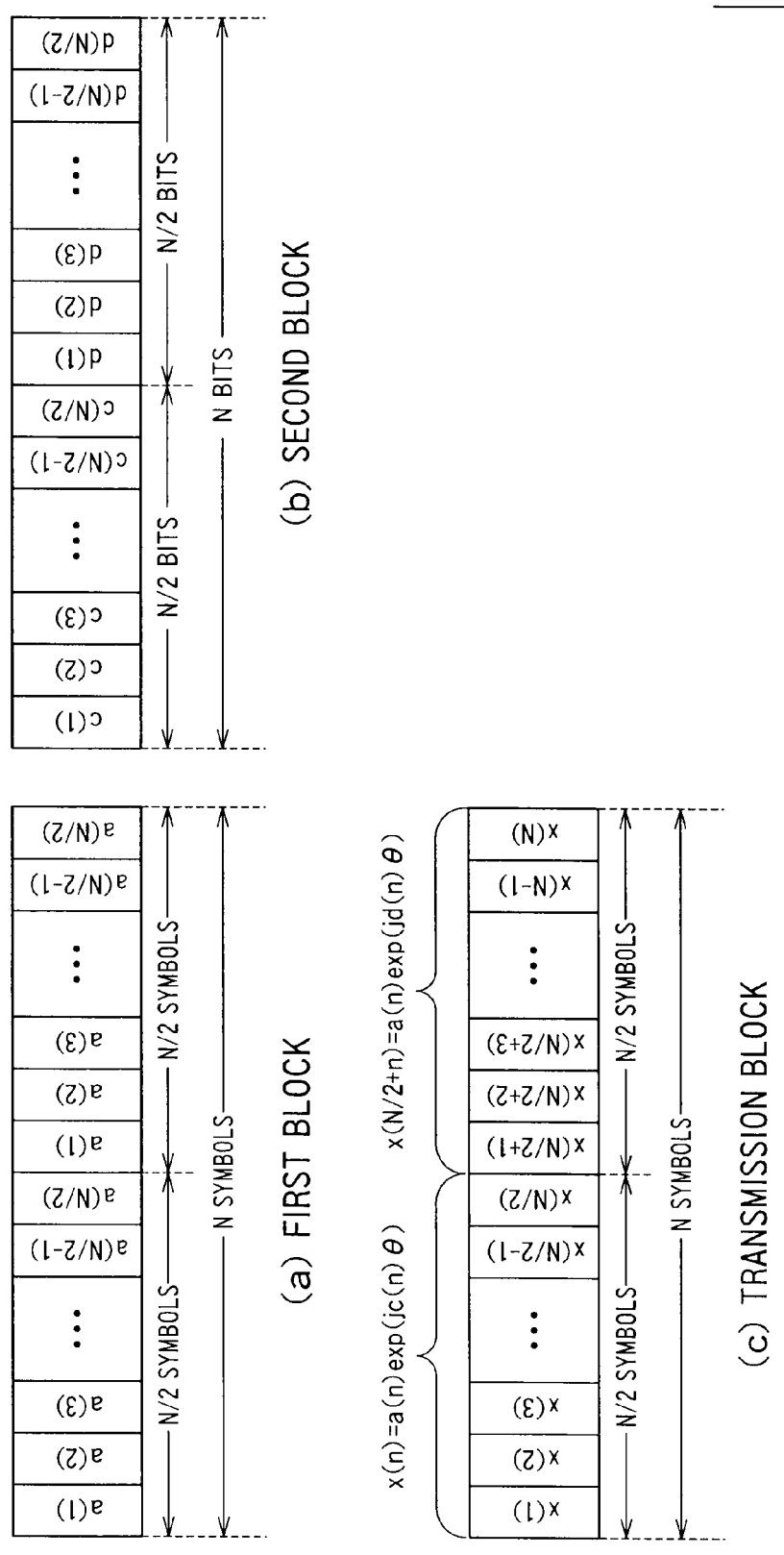
FIG. 15 illustrates the operation of an eighth configuration example of the transmitter according to the embodiment of the present invention.

FIG. 14 shows an eighth configuration example of the transmitter according to the embodiment of the present invention. As in the case of the first configuration example shown in FIG. 1, a first modulation unit 11 generates a modulation symbol a(n)(n=1, 2 . . . , N/2) from a first bit sequence. A first block generation unit 12 outputs a first block made up of N symbols which repeat a(1) to a(N/2) twice. FIG. 15(*a*) shows a configuration example of the first block. a(n)(first modulation symbol) corresponds, for example, to a signal point of MPSK (Multiple Phase Shift Keying) modulation.

A bit inversion unit 44 receives a second bit sequence as input. The bit sequence inversion unit 44 includes a bit sequence reception unit that receives a second bit sequence. The bit sequence inversion unit 44 inverts "0" and "1" of the second bit sequence according to the signal point of a(n). Assuming the output of the bit inversion unit 44 is c(n)(n=1, 2, . . . , N/2), a second block generation unit 15 outputs a second block made up of N bits combining c(1) to c(N/2) with one resulting from bit inversion of c(1) to c(N/2). FIG. 15(*b*) shows a configuration example of the second block. Here, "d(n)" denotes bit inversion of c(n), that is, one resulting from switchover between "0" and "1." The bit sequence of c(1) to c(N/2) corresponds to a third bit sequence.

Next, a phase control unit 45 rotates the value of an nth symbol of the first block according to the value of the nth (n=1, 2, . . . , N) bit of the second block which is the output of the second block generation unit 15. When, for example, the bit is "0," the amount of phase rotation remains 0 and when the bit is "1," the value of the nth symbol of the first block is rotated by θ[rad]. That is, the phase rotation given to a(n)(first modulation symbol) is phase rotation such that the first modulation symbols become signal points of MPSK modulation again. A block generation unit 33 outputs N symbols of the output of the phase control unit 45 as a transmission block. The set of the block generation unit 33 and the phase control unit 45 forms, for example, a transmission block generation unit. FIG. 15(*c*) shows a configuration example of a transmission block. The operations from the block generation unit 33 onward are the same as those of the fourth configuration example of the transmitter shown in FIG. 10, and therefore explanations thereof will be omitted.

The transmission block generated by the eighth configuration example of the transmitter is also essentially the same as the transmission block generated by the first to seventh configuration examples of the transmitter shown so far and can be equivalently expressed through an addition and subtraction between two modulation signal points. That is, the transmission block can be expressed in the format of x(n)=a1(*n*)+b1(*n*) and x(n+N/2)=a1(*n*)−b1(*n*). For example, assuming c(n)=1, a1(*n*)=(x(n)+x(n+N/2))/2=a(n)(1+exp(jθ))/2 and if this is read as b1(*n*)=(x(n)−x(n+N/2))/2=a(n)(1−exp(jθ)/2), the same result is obtained.

Furthermore, it is obvious that the same configuration as the fifth configuration example of the transmitter shown in FIG. 11 using Fourier transform processing can also be used as the configuration from the block generation unit onward in FIG. 14.

Figure 16:
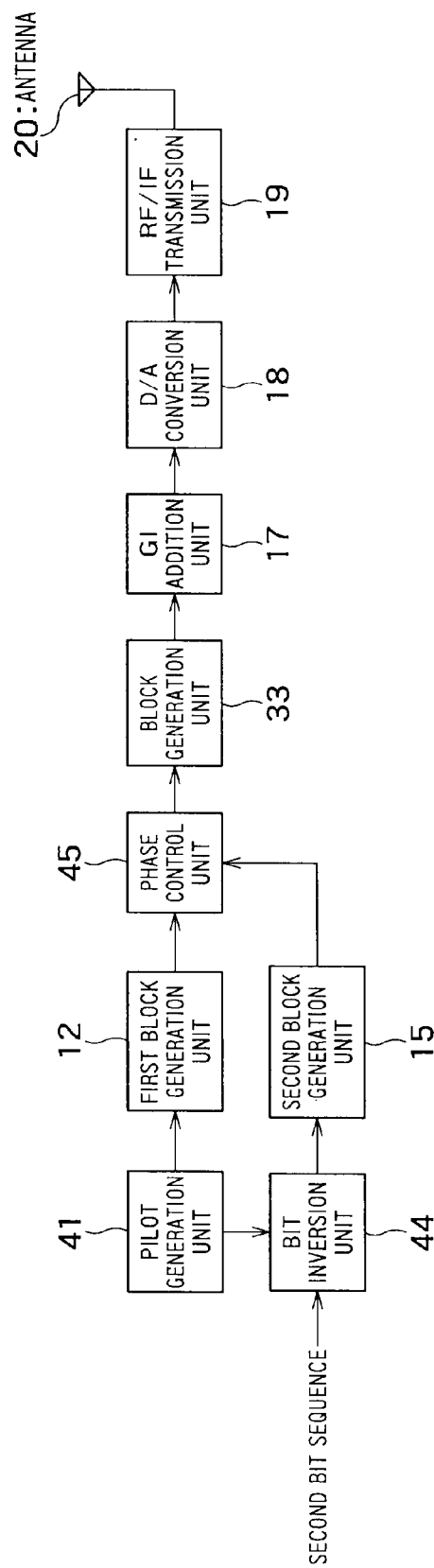
FIG. 16 shows a ninth configuration example of the transmitter according to the embodiment of the present invention.

FIG. 16 shows a ninth configuration example of the transmitter according to the embodiment of the present invention. FIG. 16 corresponds to FIG. 14 with only the first modulation unit 11 replaced by a pilot generation unit 41 and the first modulation symbol replaced by a known pilot symbol, and therefore it is obvious that discussions similar to those of the eighth configuration example hold, and therefore explanations thereof will be omitted. In the ninth configuration example, by adding simpler phase rotation to pilot symbols through a second bit sequence, it is possible to multiplex a pilot symbol with a bit sequence as in the case of the sixth and seventh configuration examples of the transmitter and the receiving side can easily separate the pilot symbol from the second bit sequence through Fourier transform as will be described later.

Hereinafter, how transmission modulation signal points in the transmission block are generated by the first modulation unit 11 (or pilot generation unit 41), signal point control unit 13 and second modulation unit 14 in the first, second, third and sixth configuration examples of the transmitter will be explained.

Figure 17:
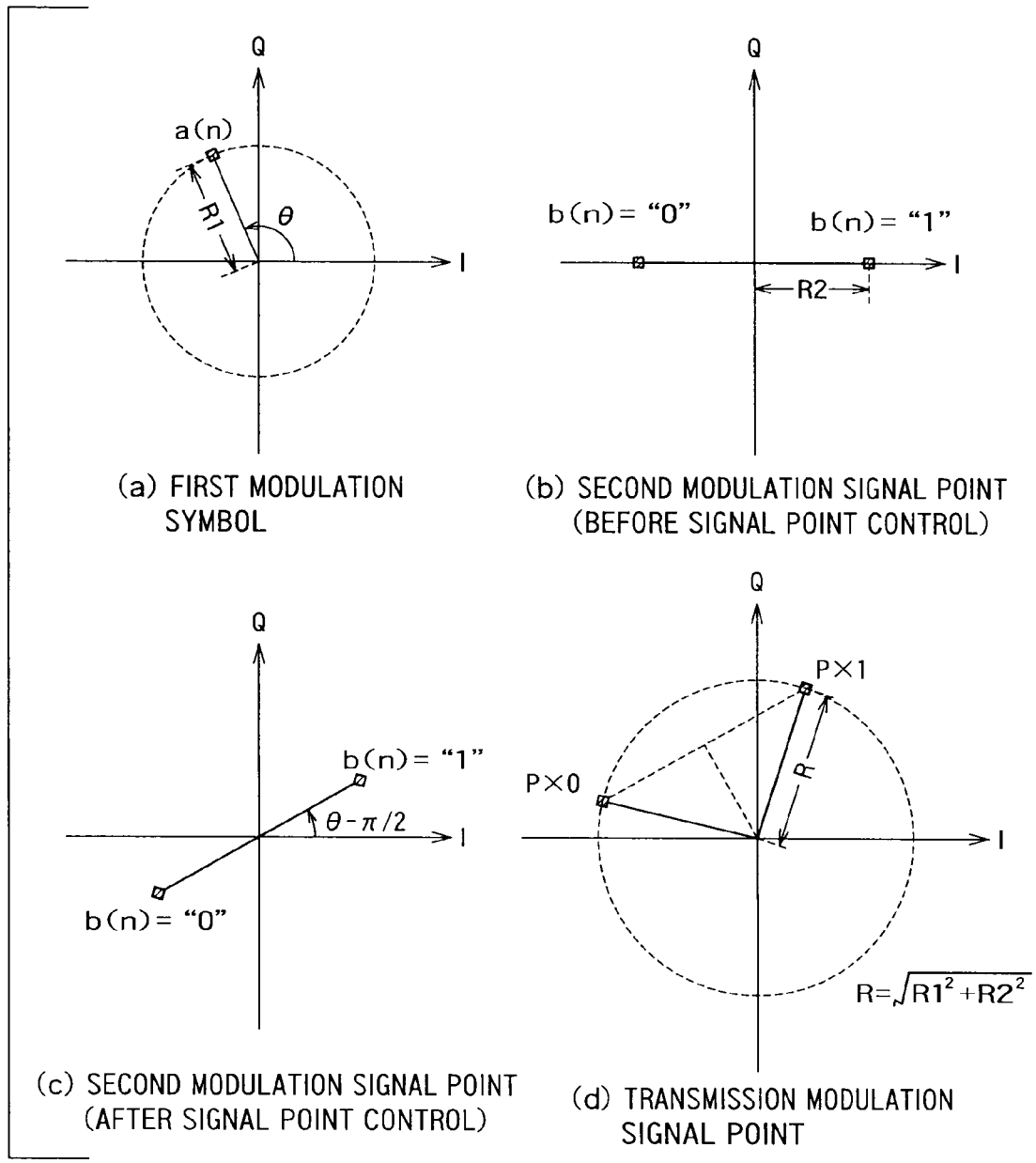
FIG. 17 illustrates the operations of a first modulation unit 11, second modulation unit 14 and signal point control unit 13 according to the embodiment of the present invention.

FIG. 17 illustrates how the signal point control unit 13 and the second modulation unit 14 operate depending on first modulation symbols (or pilot symbols) which are the outputs of the first modulation unit 11 and also elements of the first block and what transmission modulation signal points are outputted as a result.

FIG. 17(a) shows an example of a first modulation symbol a(n) and suppose a(n) is complex signal point $a(n)=R1 \times \exp(j\theta)$. Here, a(n) is one signal point of a modulation scheme such as PSK (Phase Shift Keying), QAM (Quadrature Amplitude Modulation), APSK (Amplitude Phase Shift Keying) or fixed complex signal point when a(n) is a pilot symbol.

FIG. 17(b) shows an example of second modulation signal points used by the second modulation unit 14 before being controlled by the signal point control unit 13 and shows signal points of BPSK (Binary Phase Shift Keying). In this example, $b(n)=R2$ when b(n) is bit "1" and $b(n)=-R2$ when b(n) is bit "0."

The signal point control unit 13 rotates two second modulation signal points (signal point set) of BPSK so that the I axis of BPSK becomes perpendicular to a straight line connecting the origin and a(n). To be more exact, the signal point set of BPSK is rotated so that the straight line connecting the two second modulation signal points of BPSK becomes perpendicular to the straight line connecting the origin and a(n). Here, since the phase of a(n) is θ[rad] relative to the I axis of the complex plane, control is performed such that the second modulation signal point rotated counterclockwise by θ−n/2 [rad] centered on the origin is used by the second modulation unit 14 as the second modulation signal point (FIG. 17(c)).

In the case of BPSK, the two straight lines become perpendicular to each other in two cases where the amount of rotation is θ−n/2[rad] and θ+n/2[rad], but the signal point control unit 13 may also perform control so as to always select the amount of rotation which is greater than −n/2 and not greater than n/2. Applying such control allows a signal point of bit "1" of b(n) to always exist in an area of the complex plane where the real part is 0 or greater even after rotation of the signal point. However, this excludes areas when the real part is 0 and the imaginary part is 0 or less. Performing such control of signal points also allows demodulation to be performed according to BPSK alone even if phase rotation is applied.

FIG. 17(d) shows transmission modulation signal points of $x(n)=a(n)+b(n)$ which is the nth element of the transmission block when the first modulation symbol a(n) and the second modulation symbol b(n) are as shown in FIG. 17(a) and FIG. 17(c) respectively. In the figure, "PX1" and "PX0" represent signal points in cases where b(n) is "1" and b(n) is "0" respectively. In this case, since signal points can be expressed by $x(N/2+n)=a(n)-b(n)$, there is a property that $x(N/2+n)$ is PX0 when x(n) is PX1 and $x(N/2+n)$ is PX1 when x(n) is PX0. Furthermore, amplitudes of both PX0 and PX1 are $R=\sqrt{R1^2+R2^2}$.

In this way, by rotating a signal point set of BPSK so that the I axis of the second modulation signal point or a straight line connecting two signal points of BPSK becomes perpendicular to the straight line connecting the origin and first modulation symbol, it is possible to minimize the maximum value of the amplitude R when addition or subtraction carried out between two modulation symbols a(n) and b(n) and suppress an increase in peak power of the transmission signal as a result. Furthermore, by appropriately setting the amplitudes R1 and R2 of the first modulation symbol and second modulation symbol as will be described later, it is possible to perform control so that transmission modulation signal points become signal points of a specific modulation scheme such as PSK.

Figure 18:
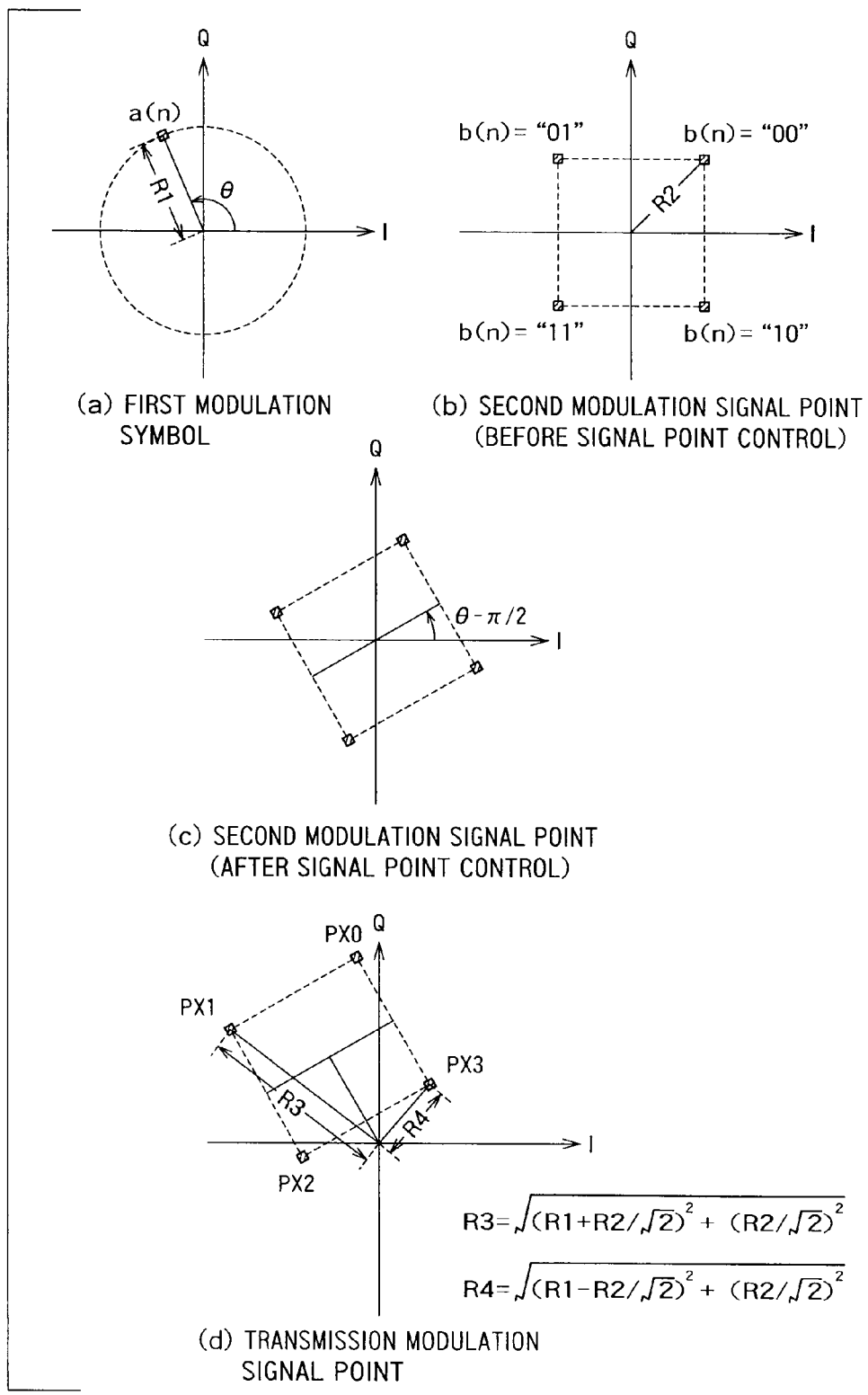
FIG. 18 is another diagram illustrating the operations of the first modulation unit 11, second modulation unit 14 and signal point control unit 13 according to the embodiment of the present invention.

FIG. 18 illustrates how the signal point control unit 13 and the second modulation unit 14 operate to generate transmission modulation signal points depending on a first modulation symbol (or pilot symbol) which is the output of the first modulation unit 11 and also an element of the first block when the second modulation unit 14 uses QPSK.

FIG. 18(a) shows an example of first modulation symbol a(n) and suppose a(n) is complex signal point $a(n)=R1 \times \exp(j\theta)$. Here, a(n) is a signal point of modulation such as PSK (Phase Shift Keying), QAM (Quadrature Amplitude Modulation), APSK (Amplitude Phase Shift Keying) or the like or a certain fixed complex signal point when a(n) is a pilot symbol.

FIG. 18(b) shows an example of second modulation signal point used by the second modulation unit 14 before being controlled by the signal point control unit 13 and shows signal points of QPSK. That is, FIG. 18(b) shows signal points when the information of two bits of b(n) is "00," "01," "10," and "11."

As shown in FIG. 18(c), the signal point control unit 13 rotates the signal points so that the straight lines which define the perimeter (outside shape) of four second modulation signal points become parallel or perpendicular to the straight line connecting the origin and a(n). That is, the signal point control unit 13 rotates the signal points so that at least any one of the straight lines connecting the neighboring signal points which define the outside shape of the four second modulation signal points (signal point set) becomes perpendicular to the straight line connecting the origin and a(n). Here, as in the case of BPSK, the signal point control unit 13 rotates the signal points of QPSK by θ−n/2[rad] counterclockwise so that the straight line connecting the origin and a(n) becomes perpendicular to the straight line connecting b(n)="01" and b(n)="00." In the case of QPSK, there are a total of four amounts of rotation whereby the straight line becomes perpendicular or parallel; θ[rad], θ−n[rad] and θ+n/2[rad] in addition to θ−n/2[rad], but the signal point control unit 13 may also perform control so as to select the amount of rotation which is always greater than −n/4 and not greater than n/4. Performing such control causes b(n)="00" to be always disposed in the first quadrant (both the real part and imaginary part are not less than 0) of the complex plane. Here, signal points on the I axis are excluded. The use of such phase rotation also allows demodulation of QPSK without knowing the phase rotation.

FIG. 18(d) shows signal points PX0 to PX3 generated by carrying out an addition and subtraction between first modulation symbol a(n) and second modulation symbol b(n). In this case, the amplitude of PX0 and PX1 becomes R3 as shown in the figure and the amplitude of PX2 and PX3 becomes R4. That is, transmission modulation signal points are generated as signal points on the circumference of a circle of amplitude $R3=\sqrt{(R1+R2/\sqrt{2})^2+(R2/\sqrt{2})^2}$ or $R4=\sqrt{(R1-R2/\sqrt{2})^2+(R2/\sqrt{2})^2}$.

Hereinafter, the configuration method of transmission modulation signal points will be explained using specific examples.

Figure 19:
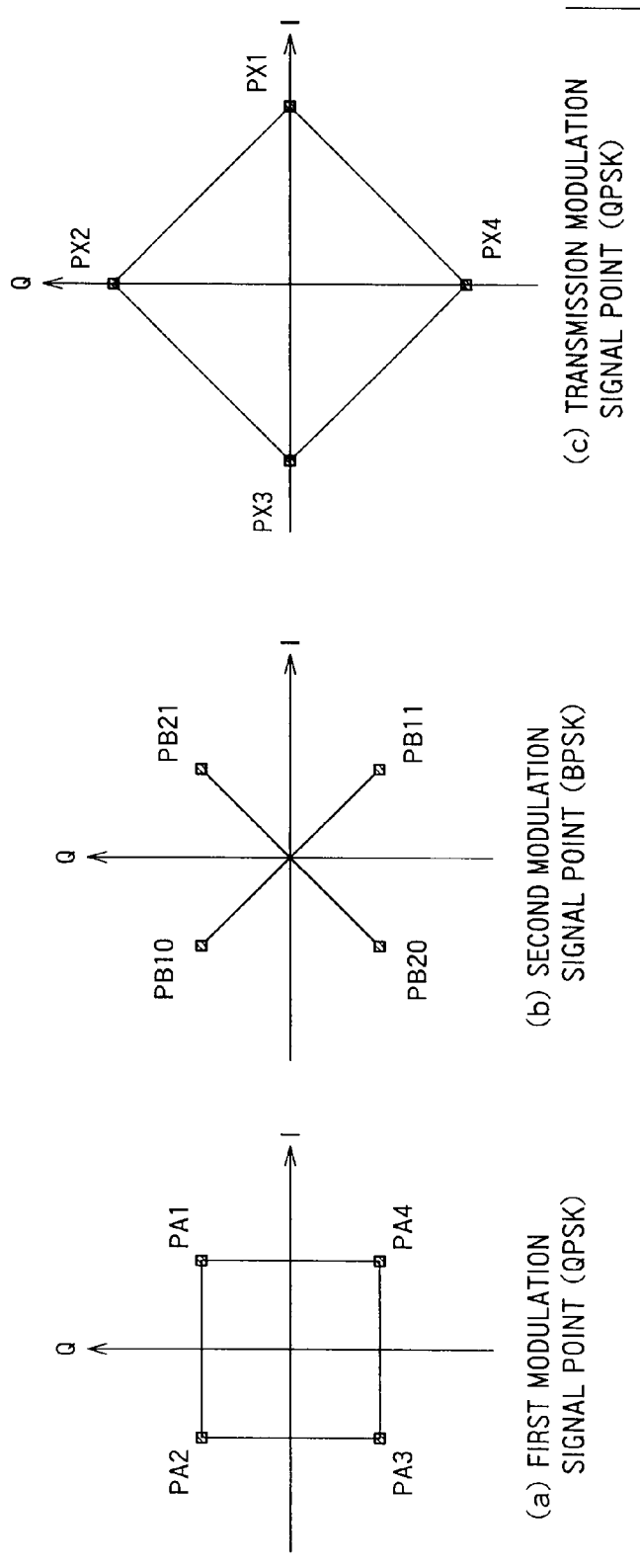
FIG. 19 shows a first configuration example of transmission modulation signal points according to the embodiment of the present invention.

FIG. 19 shows a first configuration example of transmission modulation signal points according to the embodiment of the present invention.

FIG. 19(a) shows first modulation signal points PA1 to PA4 of QPSK which is the modulation scheme of the first modulation unit 11. FIG. 19(b) shows second modulation signal points of BPSK which is the modulation scheme of the second modulation unit 14. When the first modulation signal point is PA1 or PA3, PB10 or PB11 is used as the second modulation signal point and when the first modulation signal point is PA2 or PA4, PB20 or PB21 is used. FIG. 19(c) shows transmission modulation signal points PX1 to PX4 generated through an addition and subtraction between the first modulation signal point and second modulation signal point. The example in FIG. 19(c) is the case where the amplitude (power) of the first modulation signal point and second modulation signal point are the same and as a result, the transmission modulation signal points become QPSK as in the case of the first modulation signal point. However, the amplitude becomes $\sqrt{2}$ times. The transmission modulation signal points shown in FIG. 19(c) can be directly generated from the first bit sequence and second bit sequence using the signal point selection unit 31 in the fourth or fifth configuration example of the transmitter shown in FIG. 10 and FIG. 11.

FIG. 20 provides a summary of an example of relationship between a first bit sequence, second bit sequence and transmission modulation signal point with respect to the first configuration example (FIG. 19) of transmission modulation signal points. FIG. 20 also describes the corresponding first modulation signal point and second modulation signal point together. When, for example, two bits of the first bit sequence are "00" and one bit of the second bit sequence is "0," PX2 is selected for x(n) and PX1 is selected for x(N/2+n) as transmission modulation signal points. In the example of FIG. 20, the real part of the second modulation signal point when the bit of the second bit sequence is "1" is set to become 0 or more (however excluding the case where the real part is 0 and the imaginary part is 0 or less). The combination of the bit sequences and modulation signal point in FIG. 20 is merely an example, and it is obvious that the same discussion holds in other combinations. FIG. 21 provides a summary of another example of relationship between a first bit sequence, second bit sequence and transmission modulation signal point with respect to the first configuration example (FIG. 19) of transmission modulation signal points. In the example of FIG. 21, the modulation points of BPSK of the second bit sequence are set so as to be simply rotated with respect to the first modulation signal point. These figures show the amount of phase rotation[rad] with respect to the reference phase of BPSK in FIG. 17(b) of the second modulation signal point.

Figure 22:
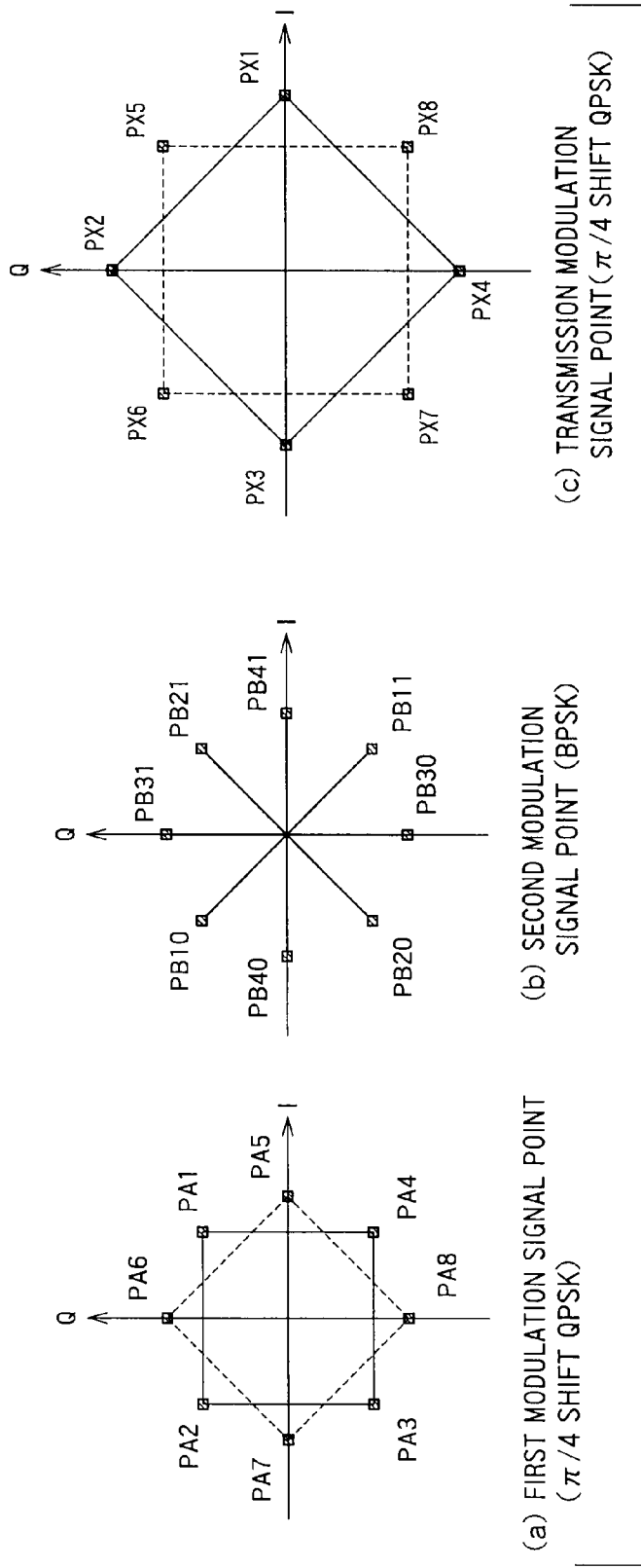
FIG. 22 shows a second configuration example of transmission modulation signal points according to the embodiment of the present invention.

FIG. 22 shows a second configuration example of transmission modulation signal points according to the embodiment of the present invention.

FIG. 22(a) shows first modulation signal points PA1 to PA4, PA5 to PA8 of n/4 shift QPSK which is the modulation scheme in the first modulation unit 11. FIG. 22(b) shows second modulation signal points of BPSK which is the modulation scheme in the second modulation unit 14. As in the case of FIG. 19, PB10 or PB11 is used as the second modulation signal point when the first modulation signal point is PA1 or PA3, PB20 or PB21 is used when the first modulation signal point is PA2 or PA4, PB30 or PB31 is used when the first modulation signal point is PA5 or PA7 and PB40 or PB41 is used when the first modulation signal point is PA6 or PA8. FIG. 22(c) shows transmission modulation signal points PX1 to PX8 generated through an addition and subtraction between the first modulation signal point and second modulation signal point. In the example of FIG. 22(c), the amplitudes (power) of the first modulation signal point and second modulation signal point are the same, and as a result, the transmission modulation signal points become n/4 shift QPSK as in the case of the first modulation signal point. The second configuration example shown in FIG. 22 may also be considered as have been obtained by simply n/4 shifting the signal points shown in FIG. 19 depending on an odd-numbered symbol or even-numbered symbol.

FIG. 23 provides a summary of an example of relationship between a first bit sequence, second bit sequence and transmission modulation signal point with respect to the second configuration example (FIG. 22) of transmission modulation signal points. In the example of FIG. 23, the real part of the second modulation signal point when the bit of the second bit sequence is "1" is set to become 0 or more (however, excluding the case where the real part is 0 and the imaginary part is 0 or less). FIG. 24 provides a summary of another example of relationship between a first bit sequence, second bit sequence and transmission modulation signal point with respect to the second configuration example (FIG. 22) of transmission modulation signal points. In the example of FIG. 24, the modulation points of BPSK of the second bit sequence are set so as to be simply rotated with respect to the first modulation signal points. These figures show the amount of phase rotation[rad] of the second modulation signal point with respect to the reference phase of BPSK in FIG. 17(b).

Figure 25:
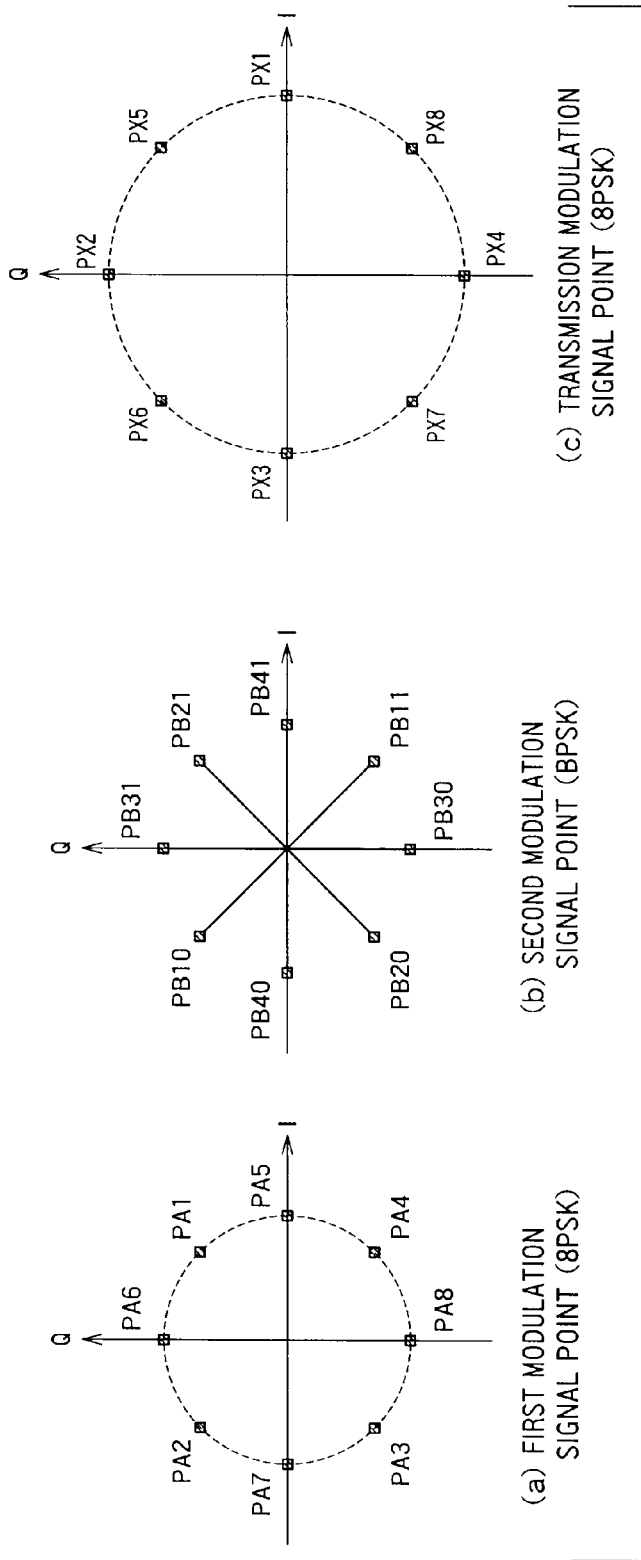
FIG. 25 shows a third configuration example of transmission modulation signal points according to the embodiment of the present invention.

FIG. 25 shows a third configuration example of transmission modulation signal points according to the embodiment of the present invention.

FIG. 25(a) shows first modulation signal points PA1 to PA8 of 8PSK which is the modulation scheme in the first modulation unit 11. FIG. 25(b) shows second modulation signal points of BPSK which is the modulation scheme in the second modulation unit 14. As in the case of FIG. 22, when the first modulation signal point is PA1 or PA3, PB10 or PB11 is used as the second modulation signal point, PB20 or PB21 is used when the first modulation signal point is PA2 or PA4, PB30 or PB31 is used when the first modulation signal point is PA5 or PA7 and B40 or PB41 is used when the first modulation signal point is PA6 or PA8. FIG. 25(c) shows transmission modulation signal points PX1 to PX8 generated through an addition and subtraction between the first modulation signal point and second modulation signal point. In the example of FIG. 22(c), the amplitudes (power) of the first modulation signal point and second modulation signal point are the same, and as a result, the transmission modulation signal points become 8PSK as in the case of the first modulation signal point. n/4 shift QPSK is equivalent to using a subset of signal points which differ between odd-numbered symbols and even-numbered symbols out of 8PSK signal points, and therefore FIG. 25 is substantially the same as FIG. 22.

FIG. 26 provides a summary of an example of relationship between a first bit sequence, second bit sequence and transmission modulation signal point with respect to the third configuration example (FIG. 25) of transmission modulation signal points. In the example of FIG. 26, the real part of the second modulation signal point when the bit of the second bit sequence is "1" is set to become 0 or more (however, excluding the case where the real part is 0 and the imaginary part is 0 or less). FIG. 27 provides a summary of another example of relationship between a first bit sequence, second bit sequence and transmission modulation signal point with respect to the third configuration example (FIG. 25) of transmission modulation signal points. In the example of FIG. 27, the modulation points of BPSK of the second bit sequence are set so as to be simply rotated with respect to the first modulation signal point. These figures show the amount of phase rotation[rad] of the second modulation signal point with respect to the reference phase of BPSK in FIG. 17(b).

Figure 28:
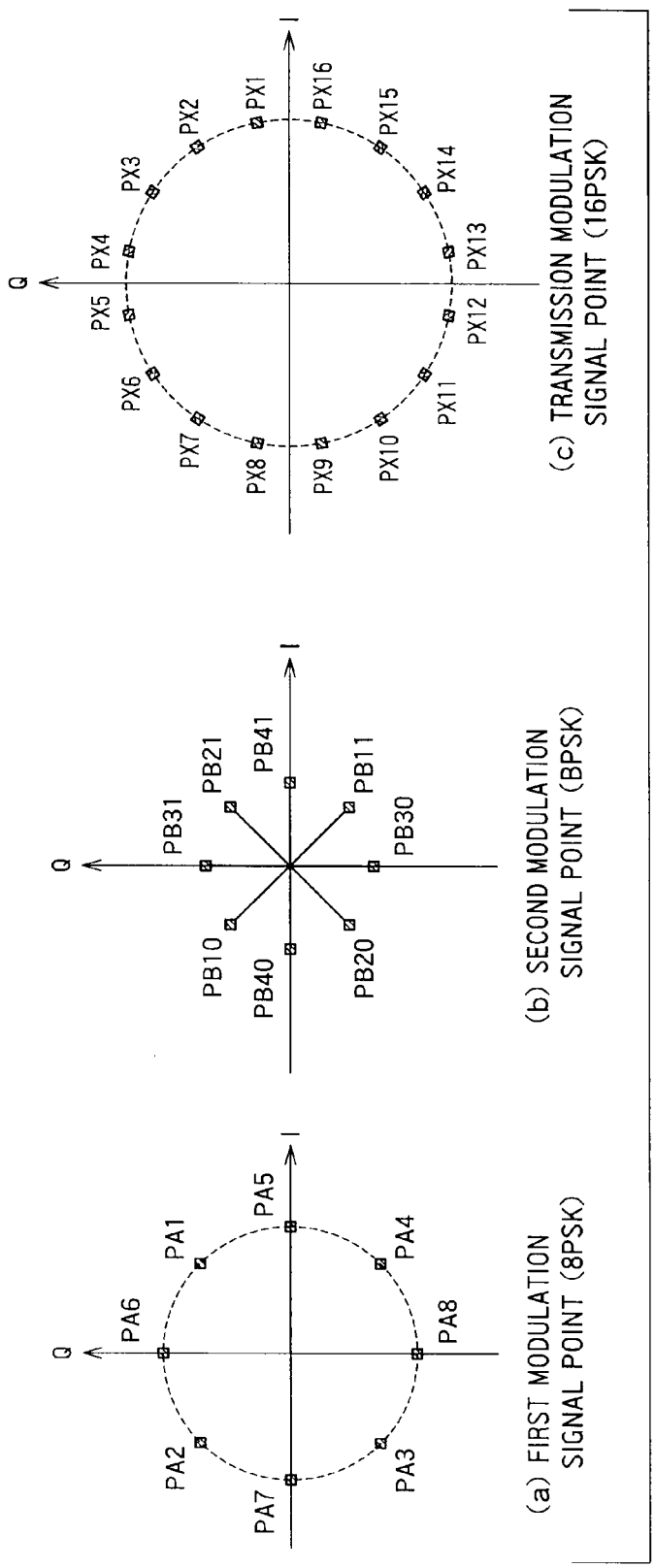
FIG. 28 shows a fourth configuration example of transmission modulation signal points according to the embodiment of the present invention.

FIG. 28 shows a fourth configuration example of transmission modulation signal points according to the embodiment of the present invention.

FIG. 28(a) shows first modulation signal points PA1 to PA8 of 8PSK which is the modulation scheme in the first modulation unit 11 and is the same as FIG. 25(a). FIG. 28(b) shows second modulation signal points of BPSK which is the modulation scheme in the second modulation unit 14. However, FIG. 28(b) differs from FIG. 25(b) in the amplitude of signal points and the ratio in amplitude between 8PSK and BPSK in FIG. 28(b) is 1:tan(0.1875π)=1:0.66818. FIG. 28(c) shows transmission modulation signal points PX1 to PX16 generated through an addition and subtraction between first modulation signal points and second modulation signal points. As a result of adjusting the amplitude of 8PSK and BPSK, transmission modulation signal points become 16PSK as shown in the figure.

FIG. 29 provides a summary of an example of relationship between a first bit sequence, second bit sequence and transmission modulation signal point with respect to the fourth configuration example (FIG. 28) of transmission modulation signal points. In the example of FIG. 29, the real part of the second modulation signal point when the bit of the second bit sequence is "1" is set to become 0 or more (however, excluding the case where the real part is 0 and the imaginary part is 0 or less). FIG. 30 provides a summary of another example of relationship between a first bit sequence, second bit sequence and transmission modulation signal point with respect to the fourth configuration example (FIG. 28) of transmission modulation signal points. In the example of FIG. 30, modulation points of BPSK of the second bit sequence are set so as to be simply rotated with respect to the first modulation signal points. These figures show the amount of phase rotation[rad] of the second modulation signal point with respect to the reference phase of BPSK in FIG. 17(b).

Figure 31:
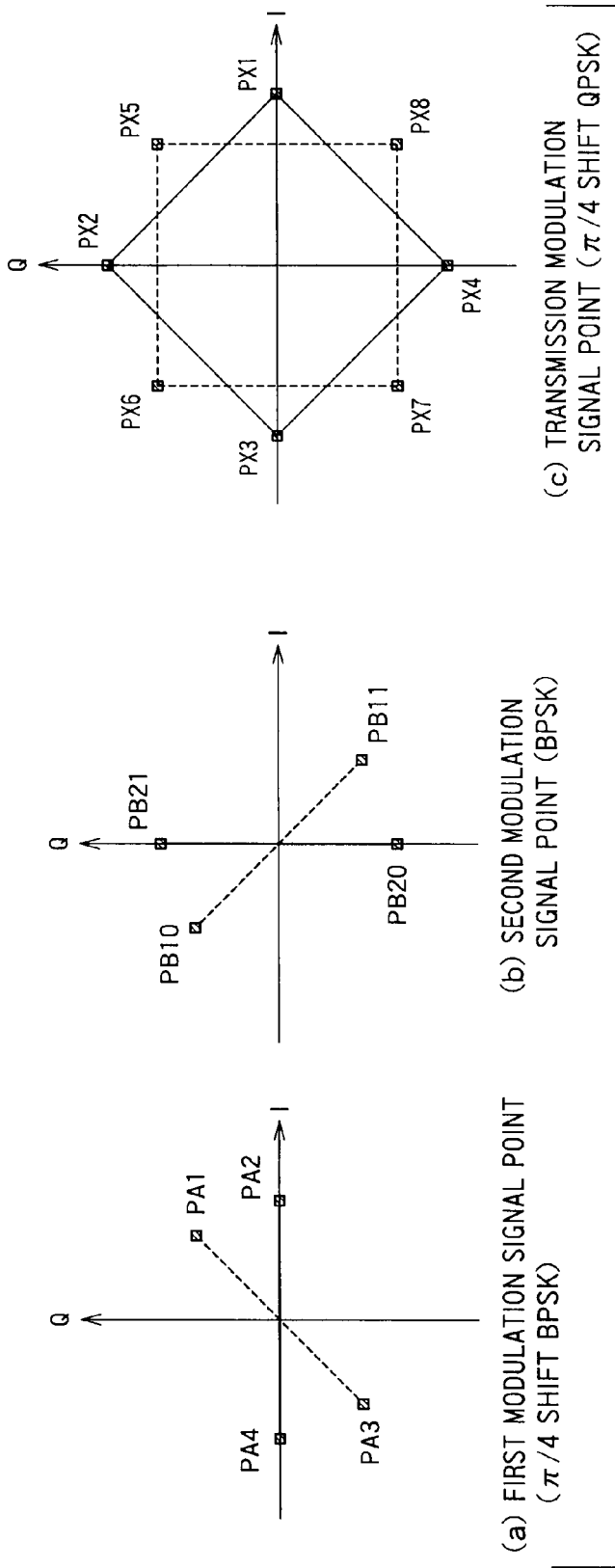
FIG. 31 shows a fifth configuration example of transmission modulation signal points according to the embodiment of the present invention.

FIG. 31 shows a fifth configuration example of transmission modulation signal points according to the embodiment of the present invention.

FIG. 31(a) shows first modulation signal points PA1 to PA4 of π/4 shift BPSK which is the modulation scheme in the first modulation unit 11. FIG. 31(b) shows second modulation signal points of BPSK which is the modulation scheme in the second modulation unit 14. When the first modulation signal point is PA1 or PA3, PB10 or PB11 is used as the second modulation signal point, and when the first modulation signal point is PA2 or PA4, PB20 or PB21 is used. FIG. 31(c) shows transmission modulation signal points PX1 to PX8 generated through an addition and subtraction between the first modulation signal points and second modulation signal points. The example of FIG. 31(c) is a case where the amplitudes (power) of the first modulation signal point and second modulation signal point are the same, and as a result, transmission modulation signal points become π/4 shift QPSK.

FIG. 32 provides a summary of an example of relationship between a first bit sequence, second bit sequence and transmission modulation signal point with respect to the fifth configuration example (FIG. 31) of transmission modulation signal points. In the example of FIG. 32, the real part of the second modulation signal point when the bit of the second bit sequence is "1" is set to become 0 or more (however, excluding the case where the real part is 0 and the imaginary part is 0 or less). FIG. 33 provides a summary of another example of relationship between a first bit sequence, second bit sequence and transmission modulation signal point with respect to the fifth configuration example (FIG. 31) of transmission modulation signal points. In the example of FIG. 33, modulated points of BPSK of the second bit sequence are set so as to be simply rotated with respect to the first modulation signal points. These figures show the amount of phase rotation[rad] of the second modulation signal point with respect to the reference phase of BPSK in FIG. 17(b).

Figure 34:
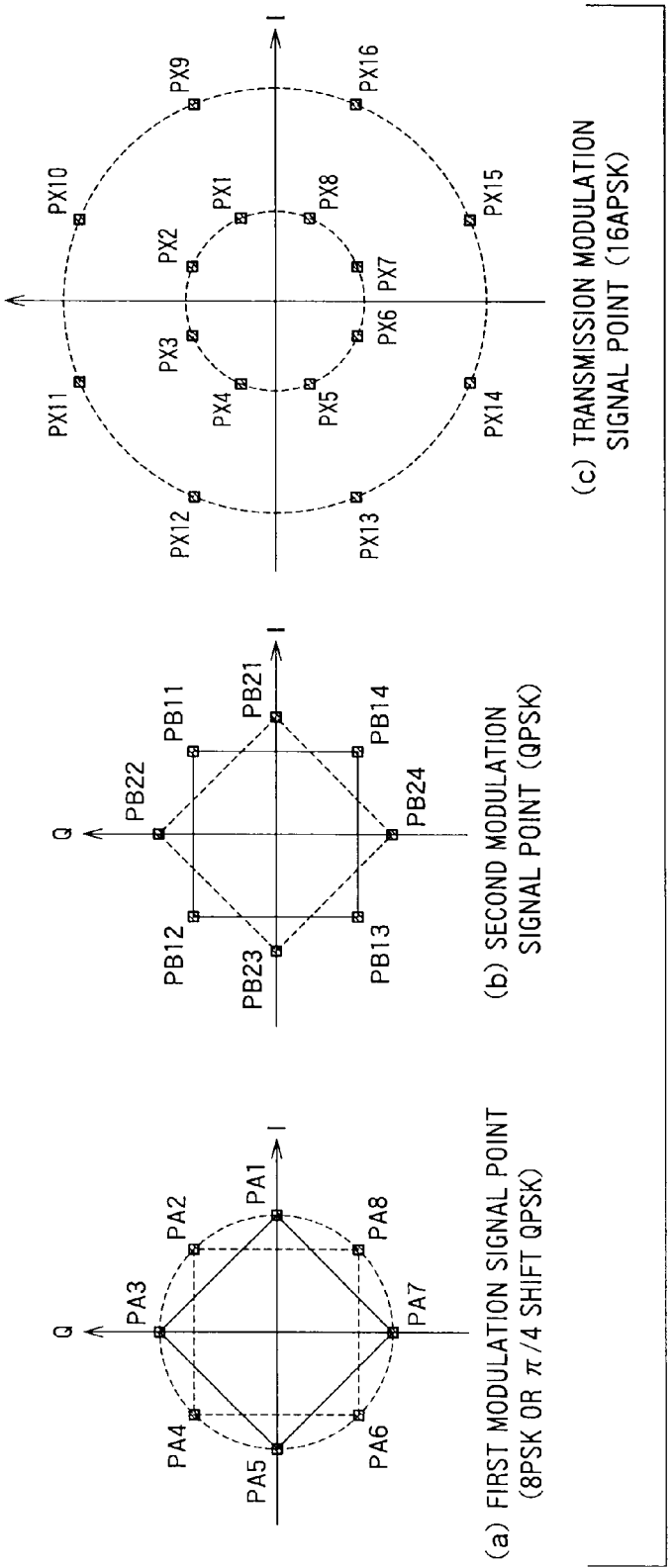
FIG. 34 shows a sixth configuration example of transmission modulation signal points according to the embodiment of the present invention.

FIG. 34 shows a sixth configuration example of transmission modulation signal points according to the embodiment of the present invention.

FIG. 34(a) shows first modulation signal points PA1 to PA8 of 8PSK or π/4 shift QPSK which is the modulation scheme in the first modulation unit 11. FIG. 34(b) shows second modulation signal points of QPSK which is the modulation scheme in the second modulation unit 14. When the first modulation signal points are PA1, PA3, PA5 and PA7, any one of PB11, PB12, PA13 and PA14 is used as the second modulation signal point and when the first modulation signal points are PA2, PA4, PA6 and PA8, any one of PB21, PB22, PB23 and PB24 is used. FIG. 34(c) shows transmission modulation signal points generated through an addition and subtraction between the first modulation signal points and second modulation signal points. The example of FIG. 34(c) shows the case where the amplitudes (power) of the first modulation signal point and second modulation signal point are the same, and as a result, the transmission modulation signal points become signal points PX1 to PX16 of 16APSK made up of two 8PSKs having different amplitudes. In this case, if the amplitudes of both the first modulation signal point and second modulation signal point are assumed to be R, the amplitudes of signal points of 16APSK become $\sqrt{2+\sqrt{2}}R=1.8478R$ and $\sqrt{2-\sqrt{2}}R=0.76537R$.

FIG. 35 provides a summary of an example of relationship between a first bit sequence, second bit sequence and transmission modulation signal point with respect to the sixth configuration example (FIG. 34) of transmission modulation signal points. In the example of FIG. 35, the second modulation signal points when the bits of the second bit sequence are "00" are set so as to be located in the first quadrant (both the real part and imaginary part are 0 or more except points on the I axis). FIG. 36 provides a summary of another example of relationship between a first bit sequence, second bit sequence and transmission modulation signal point with respect to the sixth configuration example (FIG. 34) of transmission modulation signal points. In the example of FIG. 36, modulated points of QPSK of the second bit sequence are set so as to be simply rotated with respect to the first modulation signal points. These figures show the amount of phase rotation[rad]

of the second modulation signal points with respect to the reference phase of QPSK in FIG. 18(b).

Next, an example of a method of generating transmission blocks according to the eighth and ninth configuration examples (FIG. 14 and FIG. 16) of the transmitter will be shown. A case where N/2 symbols a(n)(n=1, 2, ..., N/2) of the output from the first modulation unit 11 or pilot generation unit 41 are modulation signal points of n/4 shift QPSK shown in FIG. 22(c) will be explained as an example. That is, a(n) is a signal point which is any one of PX1 to PX4 when n is an even number or PX5 to PX8 when n is an odd number. The bit inversion unit 44 inverts the values of bits of the second bit sequence depending on a signal point of a(n) of the first modulation unit 11 or pilot generation unit 41. The second bit sequence is changed to a bit sequence c(n)(n=1, 2, ..., N/2) of N/2 bits with some bits inverted by the bit inversion unit 44 depending on the case. If the phase control unit 45 is assumed to perform phase rotation of 0 or n/2[rad], N symbols of the transmission block is x(n)=a(n), x(N/2+n)=j×a(n) when c(n) or d(n)="0" and x(n)=j×a(n), x(N/2+n)=a(n) when c(n) or d(n)="1" and it is understandable that a transmission block can be generated for a(n) through a simple operation. Here, j=$\sqrt{-1}$. In this case, since phase rotation of only 0 or n/2[rad] is added to x(n) with respect to a(n), it is obvious that signal points of x(n) are also on signal points of the same n/4 shift QPSK as a(n). It is obvious that when, for example, a(n) is a signal point of 8PSK, x(n) is also a signal point of 8PSK and when a(n) is a signal point of 16PSK, x(n) is also a signal point of 16PSK.

FIG. 37 provides a summary of a relationship between a first modulation signal point, second bit sequence and transmission modulation signal point when the bit inversion unit 44 sets bit inversion so as to be equivalent to the second configuration example of transmission modulation signal points shown in FIG. 23. Here, "b(n)" denotes a bit to be inputted to the bit inversion unit 44 and "c(n)" denotes a bit to be outputted from the bit inversion unit 44. Furthermore, "d(n)" denotes bit-inverted c(n). As shown above, since the transmission block generated by this method is completely equivalent to one expressed through an addition and subtraction between two modulation signal points as shown in FIG. 23, bit inversion in this bit inversion unit 44 means that "0" and "1" of signal points of BPSK of the second modulation signal points are simply switched round so that bits "1" of the second modulation signal points become 0 or more of the real part on the complex plane.

FIG. 38 provides a summary of a relationship between a first modulation signal point, second bit sequence and transmission modulation signal point when the bit inversion unit 44 sets bit inversion so as to be equivalent to the second configuration example of transmission modulation signal points shown in FIG. 24. Since this case corresponds to simple rotation of modulation signal points of BPSK, bit inversion is not necessary and b(n) and c(n) in FIG. 38 are the same.

The fact that the transmission block generated in the eighth or ninth configuration example of the transmitter using the above described method is essentially equivalent to the transmission block generated in the first to seventh configuration examples of the transmitter will be explained. In the same way as the above described examples, suppose the nth symbol x(n) of the transmission block generated in the eighth or ninth configuration example of the transmitter is a signal point of n/4 shift QPSK as shown in FIG. 22(c). Assuming, for example, that c(n)="0" and x(n)=AX1, x(N/2+n)=AX2=j×AX1, x(n) and x(N/2+n) can be expressed as x(n)=a1(n)+b1(n), x(N/2+n)=a1(n)−b1(n) using addition and subtraction of first modulation signal point a1(n) in FIG. 22(a) and second modulation signal point b1(n) shown in FIG. 22(b). However, a1(n)=PA1, b1(n)=PB10. As explained in the first to seventh configuration examples of the transmitter, it is appreciated that x(n) and x(N/2+n) are expressed through an addition and subtraction between the two modulation signal points respectively and therefore all the transmission blocks generated in the first to ninth configuration examples of the transmitter are essentially equivalent. In this case, the output a(n) of the first modulation unit 11 in FIG. 14 is equivalent, for example, to the output a1(n) of the first modulation unit 11 in FIG. 1 and it is obvious that there is a relationship that a(n) simply corresponds to a1(n) multiplied by a fixed value $\sqrt{2}\exp(-jn/4)$. It is likewise appreciated that c(n) has a one-to-one correspondence with b1(n).

A comparison between FIG. 23 and FIG. 37 shows that the value of the first data sequence and the value of the second data sequence (b(n) in the case of FIG. 37) to generate the same transmission modulation signal points are completely the same. Likewise, a comparison between FIG. 24 and FIG. 38 shows that the values of the first data sequence and second data sequence (b(n) in the case of FIG. 38) to generate the same transmission modulation signal points are also completely the same. That is, even if the transmitter generates transmission blocks according to the eighth or ninth configuration example as shown in FIG. 37 and FIG. 38, since the transmission signal of this transmission block is completely equivalent to the ones generated in the first to seventh configuration examples, the receiver can demodulate a transmission block as if generated according to FIG. 23 and FIG. 24.

Here, the eighth and ninth configuration examples of the transmitter have been explained taking the case where the first modulation signal points are n/4 shift QPSK shown in FIG. 22 as an example, but as shown in FIG. 19, FIG. 25, FIG. 28, FIG. 31, it is obvious that even if the first modulation signal points are QPSK, 8PSK, 16PSK, BPSK, it is possible to generate transmission blocks through phase rotation on the first modulation signal points using a similar method.

Hereinafter, the configuration of the receiver to receive a signal transmitted from the transmitter in the first to ninth configuration examples will be explained.

Figure 39:
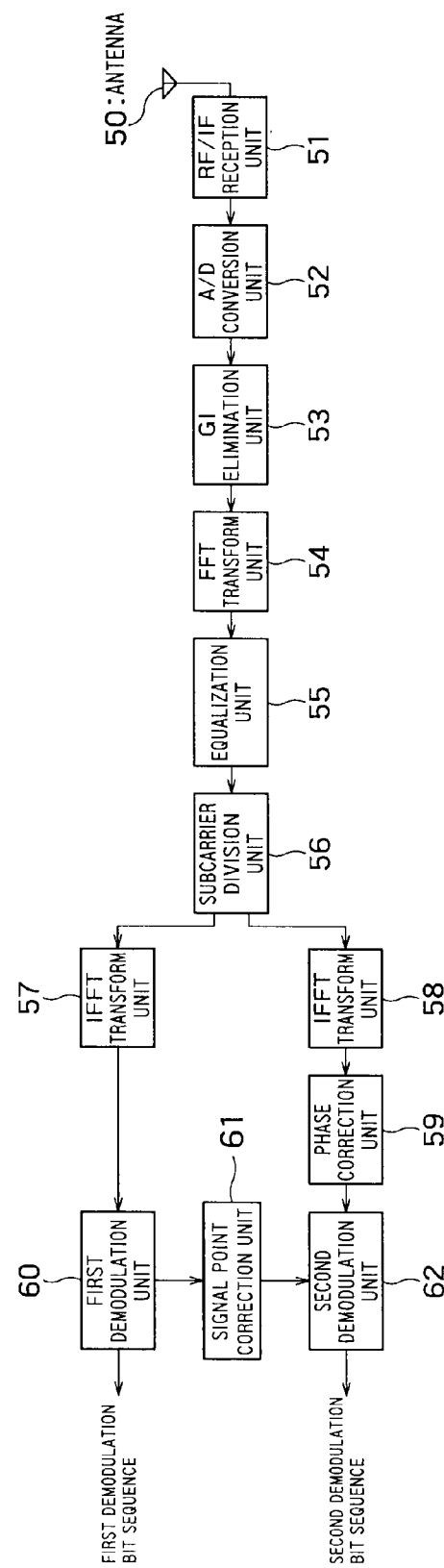
FIG. 39 shows a first configuration example of a receiver according to the embodiment of the present invention.

FIG. 39 shows a first configuration example of the receiver according to the embodiment of the present invention. The first configuration example of the receiver is a configuration of the receiver to receive a signal from the transmitter in the first to fifth and eighth configuration examples.

Figure 40:
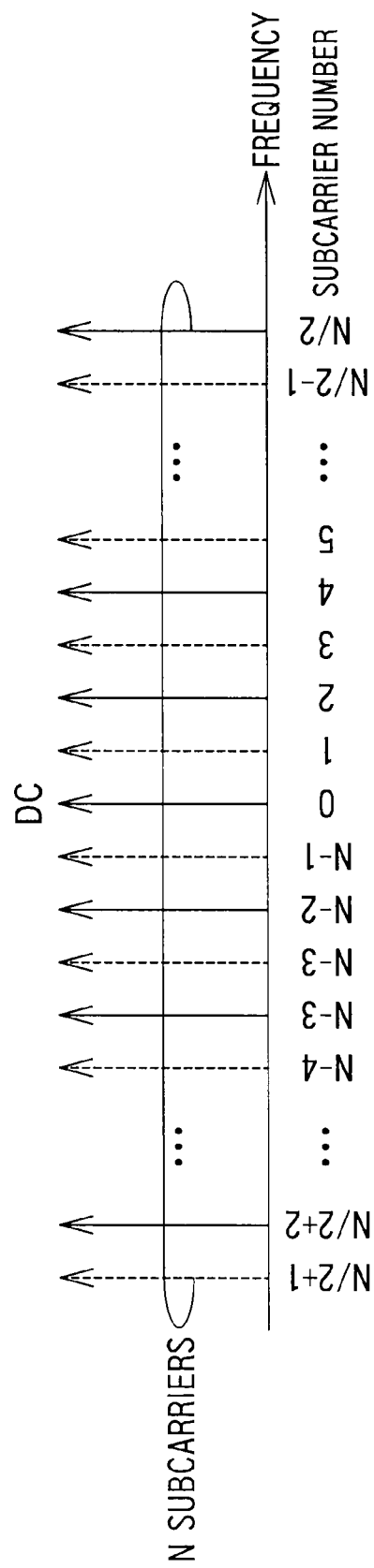
FIG. 40 shows an example of output of an FFT transform unit of the receiver according to the embodiment of the present invention.

A radio signal received from an antenna 50 is converted to a baseband signal through an RF/IF reception unit 51 and converted from an analog signal to a digital signal by an A/D conversion unit 52. A GI elimination unit 53 removes a guard interval of the length added to the digital signal by the GI addition unit 17 of the transmitter. Next, an FFT transform unit (Fourier transform unit) 54 performs Fourier transform on the transmitted transmission block and decomposes the received transmission block into mutually orthogonal frequency components (subcarriers). Suppose the received signal subjected to Fourier transform is called "received frequency data" here. FIG. 40 shows an example of N frequency components (subcarriers) at the output of the FFT transform unit 54 containing the received frequency data. Next, an equalization unit 55 multiplies the received frequency data by a complex number for each frequency component to correct distortion on the communication path and corrects the communication path. Examples of the correction method include equalization methods of MMSE (Minimum-Mean Square Error) and ZF (Zero-Forcing) standards. Furthermore, though detailed explanations will be omitted because this is not the focus of the present invention, when filter processing is applied to a transmission signal, more than N frequency components include transmission block components at the output of the FFT transform unit 54, but since a number (exceeding N) of surplus frequency components are alias components, these surplus frequency components can be combined with N frequency components in the equalization processing at the equalization unit 55.

Figure 41:
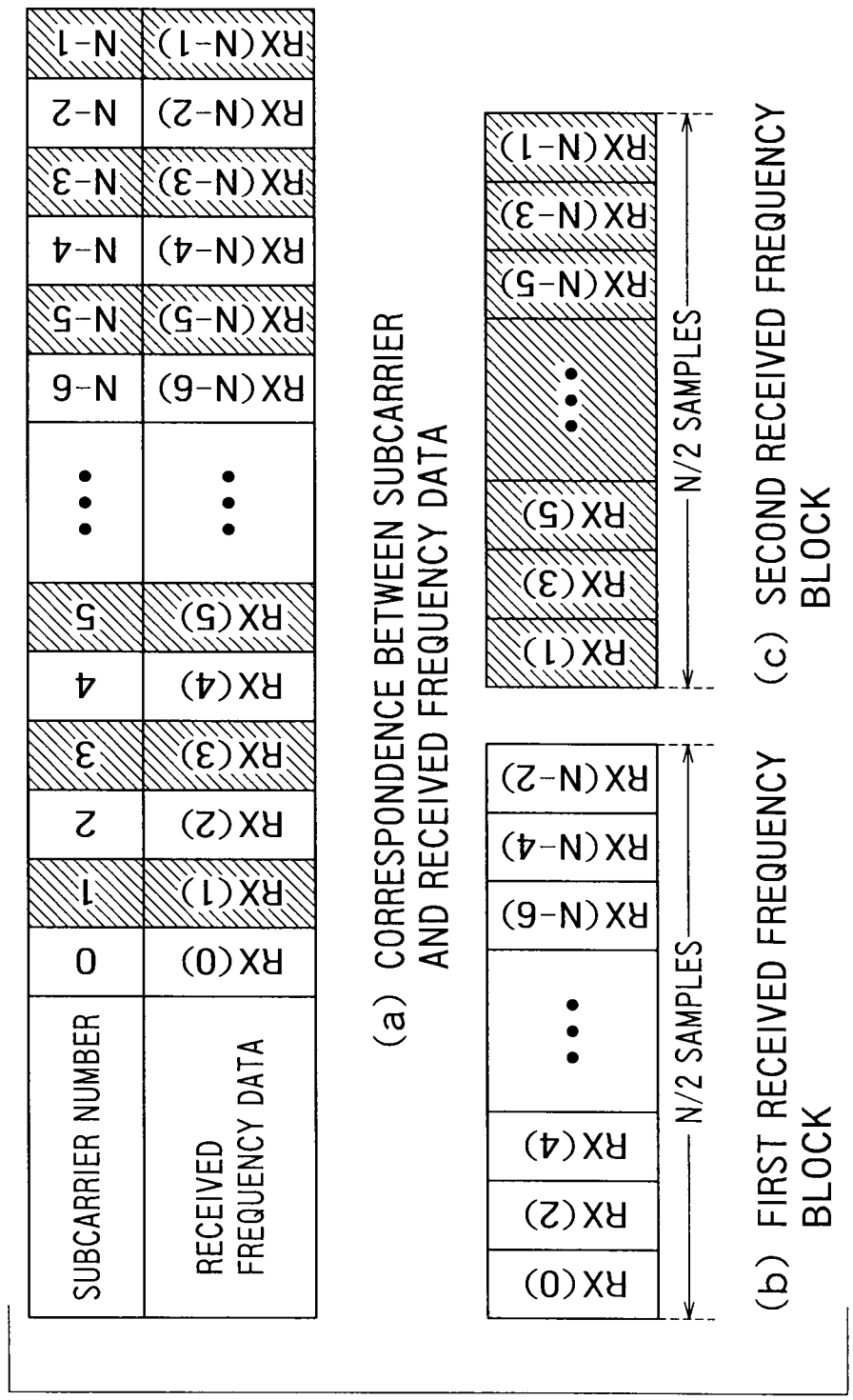
FIG. 41 illustrates the operation of a subcarrier division unit according to the embodiment of the present invention.

Next, a subcarrier division unit (separation unit) 56 divides the received frequency data composed of the N frequency components subjected to the equalization processing into even-numbered frequency components and odd-numbered frequency components. FIG. 41 shows an example of dividing the received frequency data into a first received frequency block (first received frequency data) composed of the even-numbered frequency components and a second received frequency block (second received frequency data) composed of the odd-numbered frequency components. FIG. 41(*a*) shows the correspondence between the received frequency data and subcarriers, FIG. 41(*b*) shows the first received frequency block and FIG. 41(*c*) shows the second received frequency block. The even-numbered or odd-numbered frequency components correspond, for example, to every other first frequency components out of the plurality of frequency components and the odd-numbered or even-numbered frequency components correspond, for example, to every other second frequency components which are different from the respective first frequency components.

The first received frequency block and the second received frequency block are subjected to inverse Fourier transform processing of size N/2 at IFFT transform units 57 and 58 respectively and re-transformed into time-axis signals. The outputs of the IFFT transform units 57 and 58 are defined as a first reception block (which corresponds, for example, to a first symbol sequence including a plurality of first received symbols), a second reception block (which corresponds, for example, to a second symbol sequence including a plurality of second received symbols). The first reception block and the second reception block correspond to the transmitted first block and second block respectively.

Figure 42:
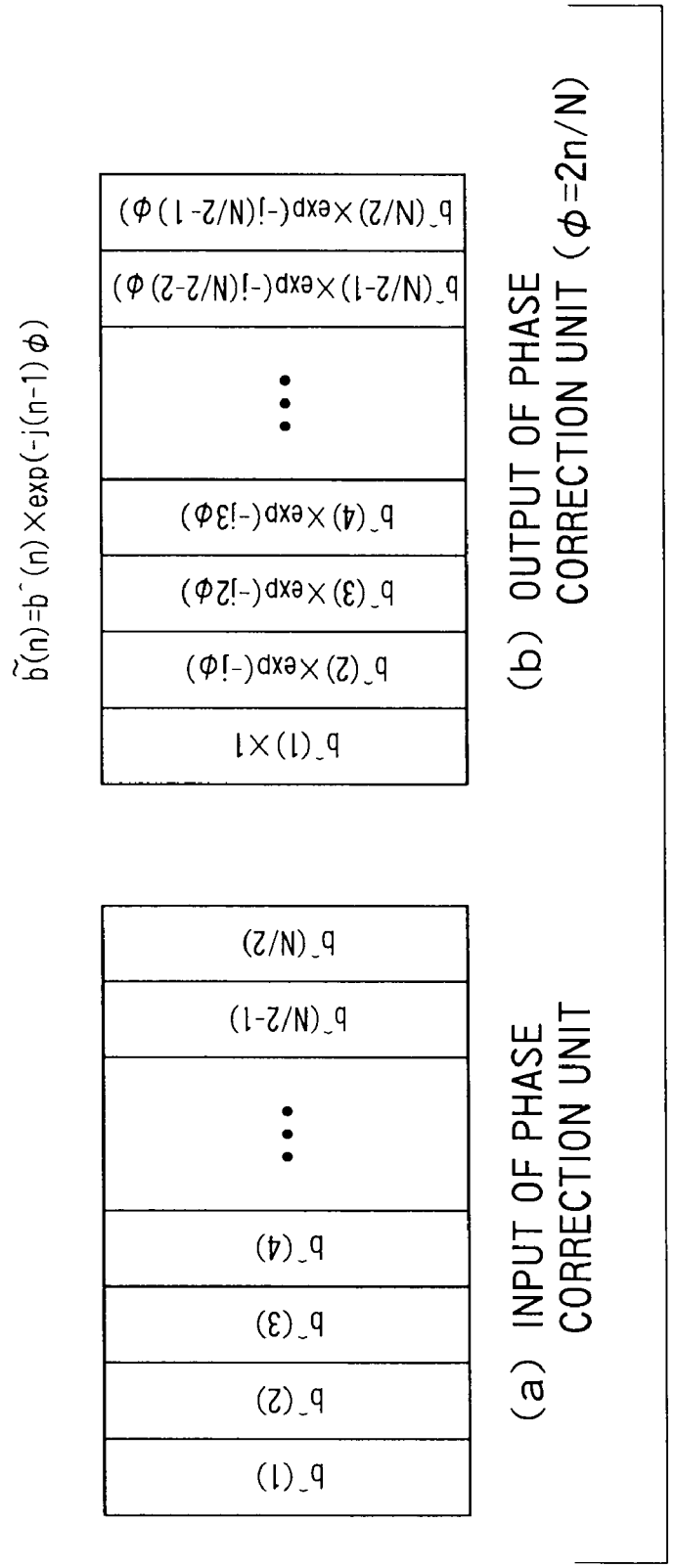
FIG. 42 illustrates the operations of a phase correction unit of the receiver according to the embodiment of the present invention.

The second reception block is composed of the odd-numbered frequency components and subjected to phase rotation at the IFFT transform unit 58, and therefore a phase correction unit 59 performs processing of compensating for phase rotation on the second reception block. FIG. 42 shows an operation example of the phase correction unit 59. As shown in FIG. 42, $\hat{b}(n)$ which is the nth (n=1, 2, ..., N/2) element of the second reception block is subjected to phase rotation and $\tilde{b}(n)=\hat{b}(n)\exp(-j(n-1)\phi)$ is outputted. Here, $\phi=2n/N$.

A first demodulation unit 60 demodulates the data modulated at the first modulation unit 11. The demodulation method may be a normal data demodulation method itself and, for example, if the first modulation unit 11 uses QPSK modulation, normal QPSK demodulation may be used.

On the other hand, a second demodulation unit 62 performs data demodulation accompanied by the demodulation result of the first reception block at the first demodulation unit 60 or signal point correction depending on the values of first received symbols themselves included in the first reception block.

Figure 43:
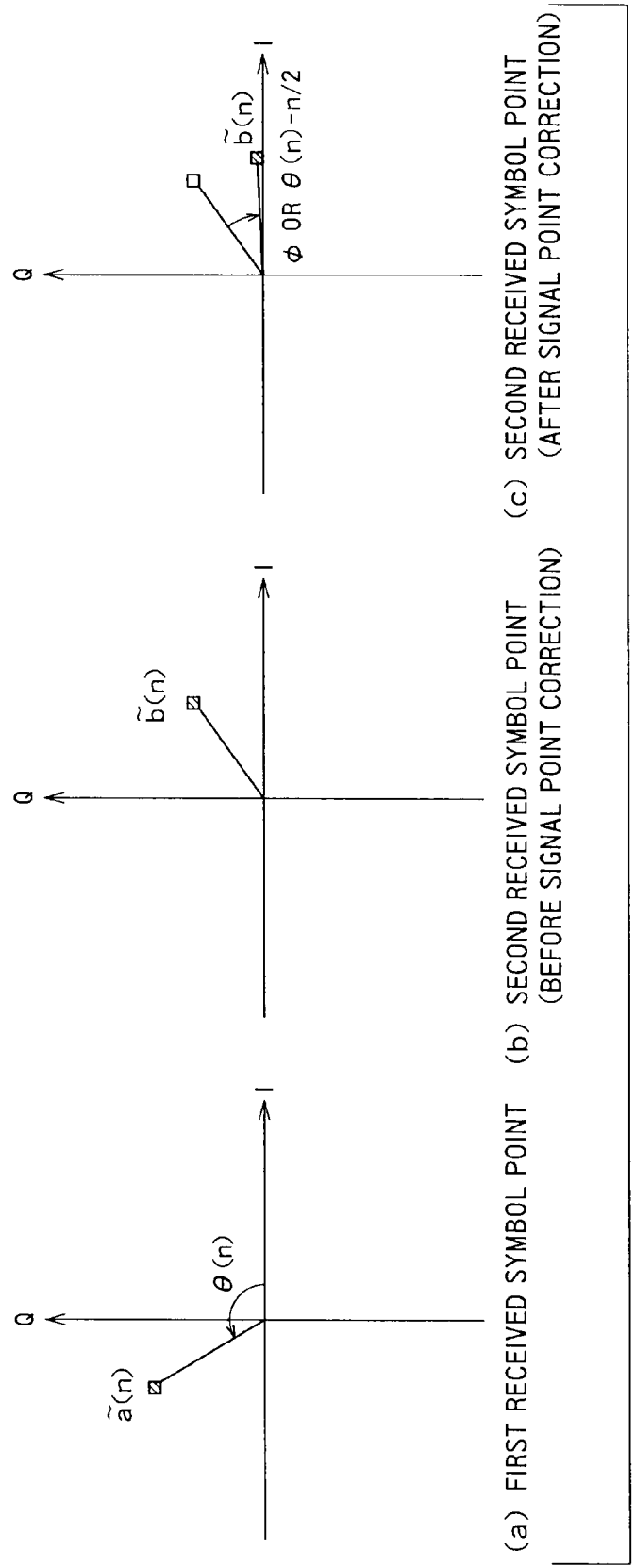
FIG. 43 illustrates the operations of a first demodulation unit, a second demodulation unit and a signal point correction unit according to the embodiment of the present invention.

FIG. 43 illustrates the operations of a signal point correction unit (signal point selection unit) 61 and the second demodulation unit 62.

FIG. 43(*a*) shows the nth element $\tilde{a}(n)$ of the first reception block itself or the decision result in the first demodulation unit and suppose the phase of $\tilde{a}(n)$ is $\theta(n)$ as shown in the figure. The signal point correction unit 61 performs control so as to cancel out the phase rotation applied at the signal point control unit 13 of the transmitter to the nth element $\tilde{b}(n)$ of the second reception block at the output of the phase correction unit 59 shown in FIG. 43(*b*).

For example, when the first modulation signal points at the transmitter are signal points of the decision result of $\tilde{a}(n)$ and the amount of phase rotation of the second modulation signal point at the signal point control unit 13 is $\phi$, $\tilde{b}(n)$ is multiplied by $\exp(-j\phi)$ and the second demodulation unit 62 performs normal BPSK demodulation having, for example, the signal points as shown in FIG. 17(*b*) (see FIG. 43(*c*)). In the case of the transmitter in the eighth configuration example, BPSK demodulation is always performed. Such processing can be performed because it is possible to judge what kind of modulation signal points are used at the second modulation unit 14 from the demodulation result of the first modulation signal points based on the correspondence of modulation signal points as shown in FIG. 20 to FIG. 35.

Alternatively, it is also possible to multiply $\tilde{b}(n)$ by $\exp(-j\theta(n))$ using not the demodulation result $\tilde{a}(n)$ at the first demodulation unit 60 but phase $\theta(n)$ before the demodulation of $\tilde{a}(n)$ and then perform normal BPSK demodulation having, for example, signal points as shown in FIG. 17(*b*) at the second demodulation unit 62. This method allows the second demodulation unit 62 to perform data demodulation without using the demodulation result of the first demodulation unit 60.

On the other hand, the second demodulation unit 62 can also perform demodulation completely independent of the first demodulation unit 60. This method is the demodulation method also applicable, for example, to a case where only even-numbered subcarriers receive considerably large interference and cannot be demodulated. As shown in FIG. 19(*b*), FIG. 22(*b*), FIG. 25(*b*), FIG. 28(*b*), FIG. 31(*b*) and FIG. 34(*b*), the number of signal points which have a possibility of being used as second modulation signal points is greater than the number of modulation signal points necessary to modulate data of original second modulation signal points. For example, in the case of FIG. 19(*b*), the modulation scheme at the second modulation unit 14 is BPSK, but second modulation signal points generated at the second modulation unit 14 belong to QPSK. However, both of the two signal points (e.g., PB10 and PB20) mean the same bit "0." That is, the second demodulation unit 62 demodulates not as BPSK but as QPSK and selects a signal point having the shortest Euclidean distance, and can thereby directly demodulate a second bit sequence. However, the error rate characteristic of demodulation in this case is a symbol error rate characteristic of not BPSK but QPSK.

Figure 44:
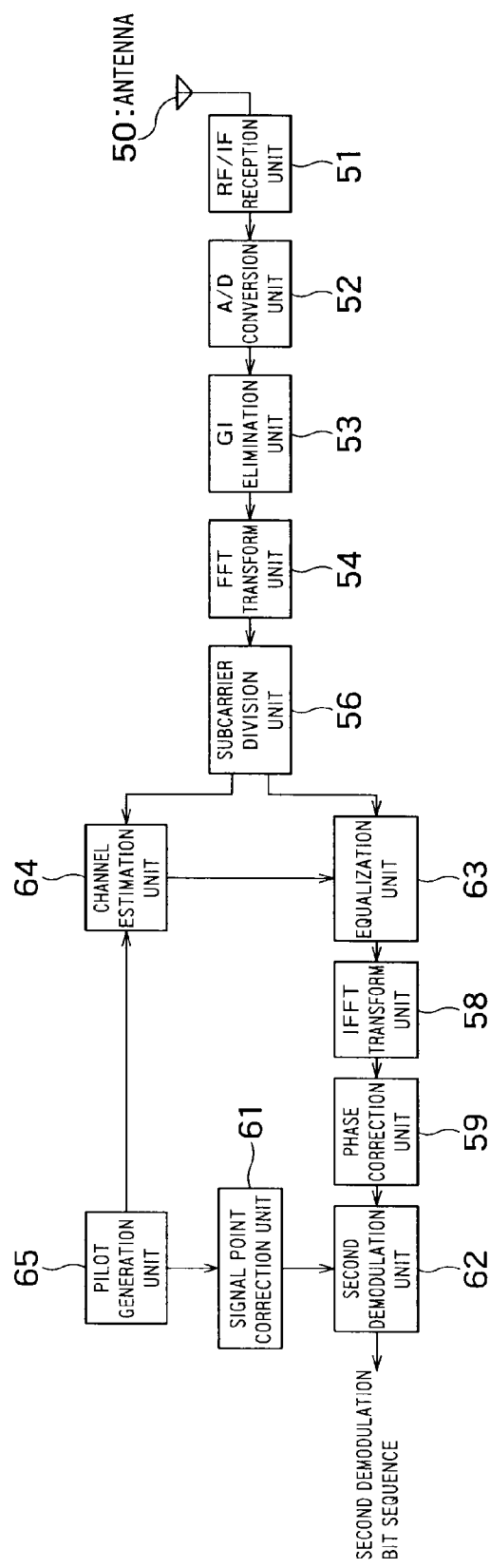
FIG. 44 shows a second configuration example of the receiver according to the embodiment of the present invention.

FIG. 44 shows a second configuration example of the receiver according to the embodiment of the present invention. The second configuration example of the receiver is the receiver configuration to receive signals from the transmitter in the sixth, seventh and ninth configuration examples. The difference from the first configuration example (FIG. 39) lies in that since it is not the first bit sequence but a pilot symbol that is transmitted, there is no first demodulation unit 60 and there are a pilot generation unit 65 that generates pilot symbols similar to those of the pilot generation unit 41 at the transmitter and a channel estimation unit (communication path estimation unit) 64 that performs channel estimation using pilot symbols instead. Furthermore, an equalization unit 63 is located after a subcarrier division unit 56 because it is only necessary for the second bit sequence. The pilot generation unit 65 corresponds to a pilot storage that stores, for example, a plurality of pilot symbols. The operations of up to the FFT transform unit 54 are the same as those of the receiver in the first configuration example, and therefore explanations thereof will be omitted.

As in the case of the example of FIG. 41, the subcarrier division unit 56 divides received frequency data into even-numbered frequency and odd-numbered frequency components respectively. The first received frequency block corresponds to a frequency response of a pilot symbol which is known data multiplied by a frequency response of the communication path. Therefore, the channel estimation unit 64 can estimate a communication path response from the first received frequency block and the pilot symbol generated at the pilot generation unit 65.

The equalization unit 63 corrects distortion of the communication path using the result of the channel estimation unit 64.

The second received frequency block subjected to equalization processing is subjected to inverse Fourier transform processing at the IFFT transform unit 58 in the same way as in FIG. 39, subjected to phase correction processing at the phase correction unit 59 in the same way as in FIG. 42 and in this way, a second reception block made up of N/2 elements is outputted from the phase correction unit 59.

The operations of a signal point correction unit (signal point selection unit) 61 and a second demodulation unit 62 are basically the same as those in the first configuration example in FIG. 39. A difference lies in that while the first configuration example uses the demodulation result of the first demodulation unit 60, the second configuration example can use a pilot symbol which is known data itself to compensate for signal points.

Figure 45:
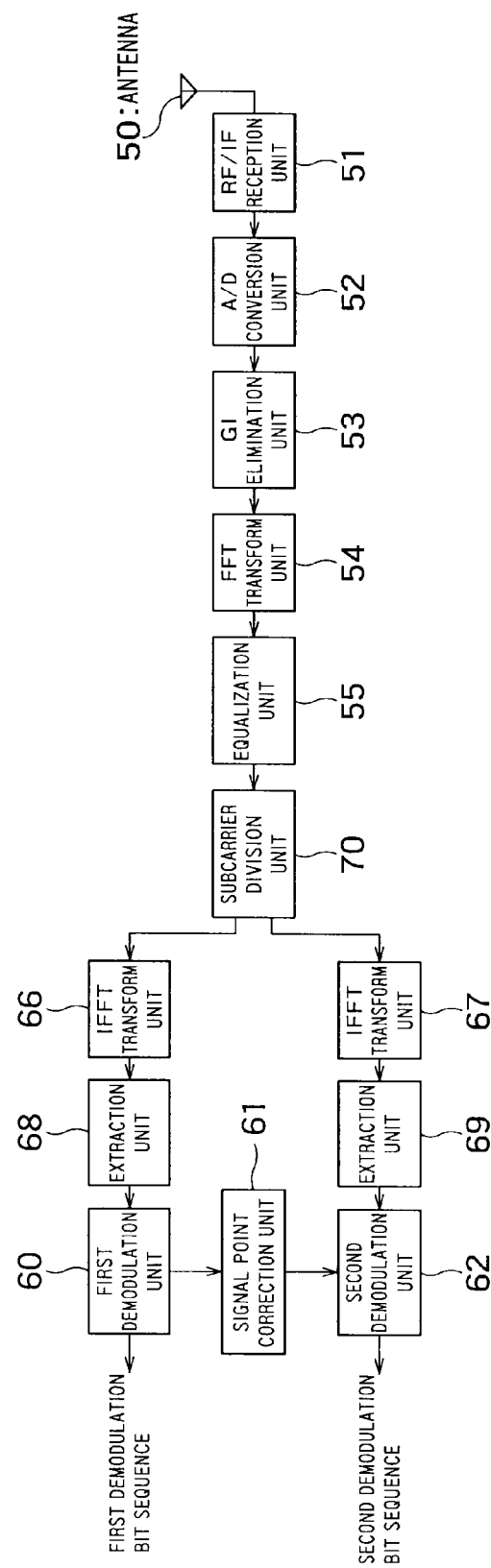
FIG. 45 shows a third configuration example of the receiver according to the embodiment of the present invention.
Figure 46:
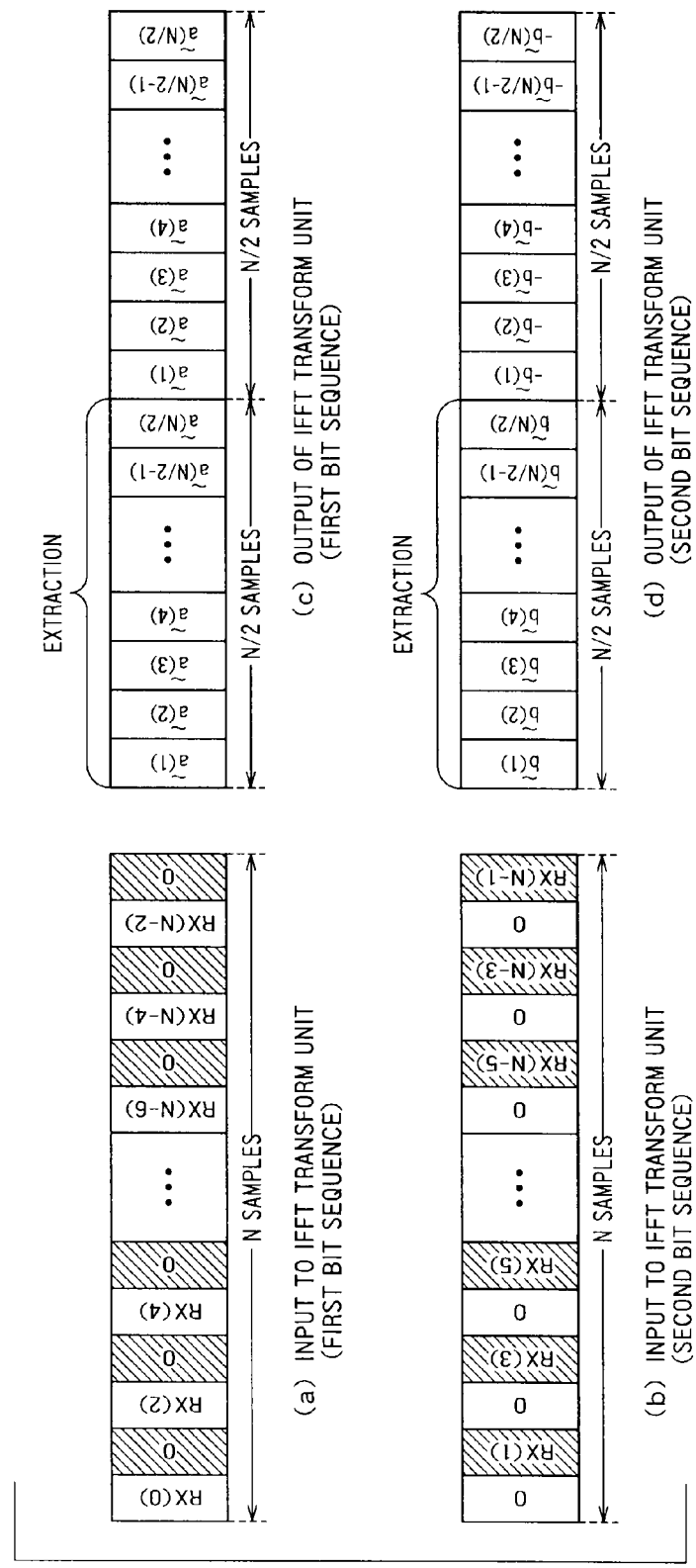
FIG. 46 illustrates the operation of a third configuration example of the receiver according to the embodiment of the present invention.

FIG. 45 shows a third configuration example of the receiver according to the embodiment of the present invention. An essential difference from the first configuration example (FIG. 39) lies in that the receiver uses IFFT transform units 66, 67 having a size of N and extraction units 68, 69 instead of using the phase correction unit 59 to demodulate each bit sequence. The processing of up to the equalization unit 55 is the same as that in the first configuration example and a subcarrier division unit (received frequency data generation unit) 70 divides the received frequency data shown in FIG. 41(*a*) into subcarriers so that a signal of N samples as shown in FIG. 46(*a*) and FIG. 46(*b*) is inputted to the IFFT transform units 66, 67. That is, a signal whose even-numbered frequency components are left unchanged and whose other components are set to 0 is inputted to the IFFT transform unit 66 and a signal whose odd-numbered frequency components are left unchanged and whose other components are set to 0 is inputted to the IFFT transform unit 67. When the IFFT transform unit (which corresponds, for example, to the first inverse Fourier transform unit) 66 of size N applies inverse Fourier transform to the signal in FIG. 46(*a*), a signal composed of repeated identical data of length N/2 (FIG. 46(*c*)) is outputted, and therefore the extraction unit (which corresponds, for example, to the first extraction unit) 68 extracts the length N/2 from the start of the output of the IFFT transform unit 66 and inputs that length to the first demodulation unit 60. Furthermore, when the IFFT transform unit (which corresponds, for example, to the second inverse Fourier transform unit) 67 of size N applies inverse Fourier transform to the signal in FIG. 46(*b*), a signal composed of repeated, identical and sign-inverted data of length N/2 (FIG. 46(*d*)) is outputted, and therefore the extraction unit (which corresponds, for example, to the second extraction unit) 69 extracts the length N/2 from the start of the output of the IFFT transform unit 67 and inputs that length to the second demodulation unit 62. In this way, the subcarrier division unit (received frequency data generation unit) 70 generates first received frequency data with the value of every other first frequency component (even-numbered frequency component or odd-numbered frequency component) out of the plurality of frequency components set to 0 and second received frequency data with the value of every other second frequency component (odd-numbered frequency component or even-numbered frequency component) which is different from each first frequency component set to 0. Input signals to respective demodulation units 60, 62 are completely the same as those in the first configuration example (FIG. 39), and therefore explanations of the subsequent operations will be omitted.

Figure 47:
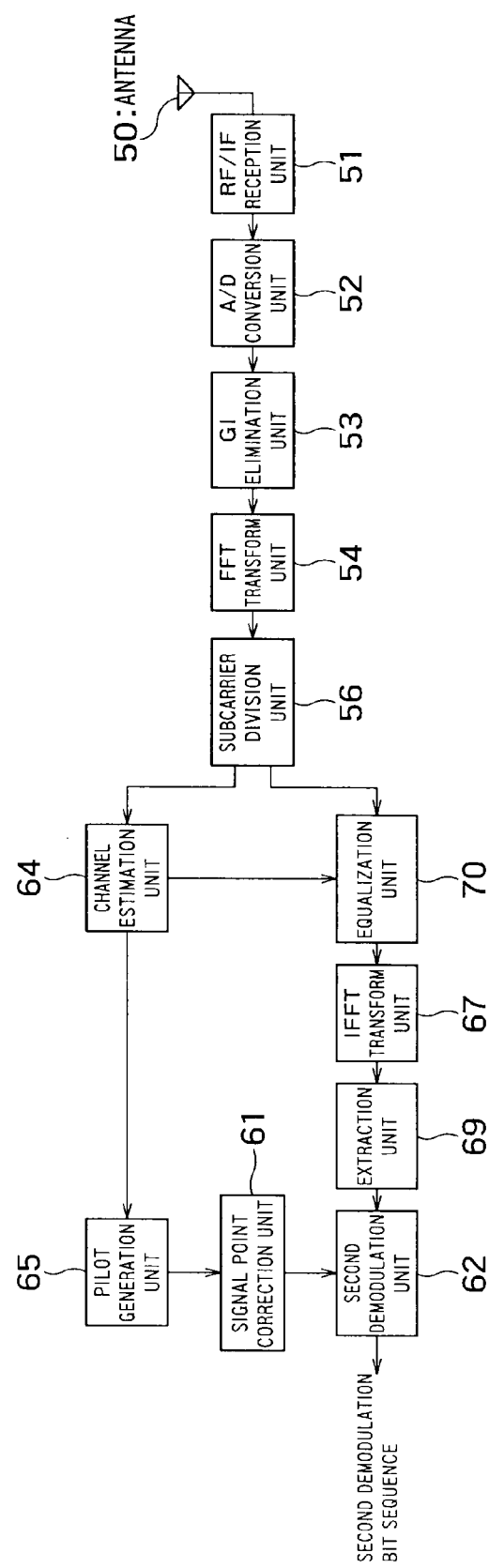
FIG. 47 shows a fourth configuration example of the receiver according to the embodiment of the present invention.

FIG. 47 shows a fourth configuration example of the receiver according to the embodiment of the present invention. The fourth configuration example of the receiver has a receiver configuration to receive signals from the transmitter in the sixth, seventh and ninth configuration examples. A difference from the third configuration example (FIG. 45) lies in that since it is not the first bit sequence but the pilot symbol that is transmitted, there is no first demodulation unit 60 and there are a pilot generation unit (pilot storage) 65 that generates a pilot symbol similar to that of the pilot generation unit 41 at the transmitter and a channel estimation unit (communication path estimation unit) 64 that performs channel estimation using the pilot symbol instead. Furthermore, another difference lies in that an equalization unit 70 is located after a subcarrier division unit 56 because the equalization unit 70 is necessary only for the second bit sequence. The rest are a combination of the second configuration example (FIG. 44) and third configuration example (FIG. 45), and therefore explanations thereof will be omitted.

The embodiments so far have explained the case where first modulation symbols generated by the first bit sequence are included in the even-numbered frequency components in the frequency domain after Fourier transform and second modulation symbols generated by the second bit sequence are included in the odd-numbered frequency components. However, it is obvious that the present invention is also applicable to the case where first modulation symbols generated by the first bit sequence are included in the odd-numbered frequency components and second modulation symbols generated by the second bit sequence are included in the even-numbered frequency components. Hereinafter, the difference in the configuration of the transmitter and the receiver when the odd-numbered frequency components and even-numbered frequency components are switched round will be explained.

In the first, second, third and sixth configuration examples of the transmitter so far, when the first modulation symbol is a(n) (n=1, 2, . . . , N/2) and the second modulation symbol is b(n) (n=1, 2, . . . , N/2), transmission symbol x(n) (n=1, 2, . . . , N) in the transmission block is x(n)=a(n)+b(n) (n=1, 2, . . . , N/2), x(N/2+n)=a(n)−b(n) (n=1, 2, . . . , N/2). If x(n) (n=1, 2, . . . , N/2) is left unchanged and x(N/2+n) is multiplied by −1 to obtain x(N/2+n)=−a(n)+b(n), the first modulation symbols are included in the odd-numbered frequency component and the second modulation symbols are included in the even-numbered frequency component. In the second configuration example of the transmitter in FIG. 4, this is equivalent to the subcarrier mapping unit 24 where the first frequency block shown in FIG. 7 is mapped to odd-numbered subcarriers and the second frequency block is mapped to even-numbered subcarriers and the phase correction unit after the second block generation unit 15 is moved to behind the first block generation unit.

Similarly, the fourth, fifth and seventh configuration examples of the transmitter mean that the transmission modulation signal point x(N/2+n) in FIG. 20, FIG. 21, FIG. 23, FIG. 24, FIG. 26, FIG. 27, FIG. 29, FIG. 30, FIG. 32, FIG. 33, FIG. 35, FIG. 36, FIG. 37 and FIG. 38 is replaced by a signal point multiplied by −1. For example, in the case of FIG. 20 and FIG. 21, signal points PX1, PX2, PX3 and PX4 of x(N/2+n) are replaced by PX3, PX4, PX1 and PX2 respectively.

Furthermore, in the eighth and ninth configuration examples of the transmitter, if a(1), a(2), . . . , a(N/2)) are assumed to be repeated with inverse signs, that is, if a(1), a(2), . . . , a(N/2), −a(1), −a(2), . . . , −a(N/2) are assumed to be a first block, the even-numbered frequency components and odd-numbered frequency components can be switched round.

Figure 48:
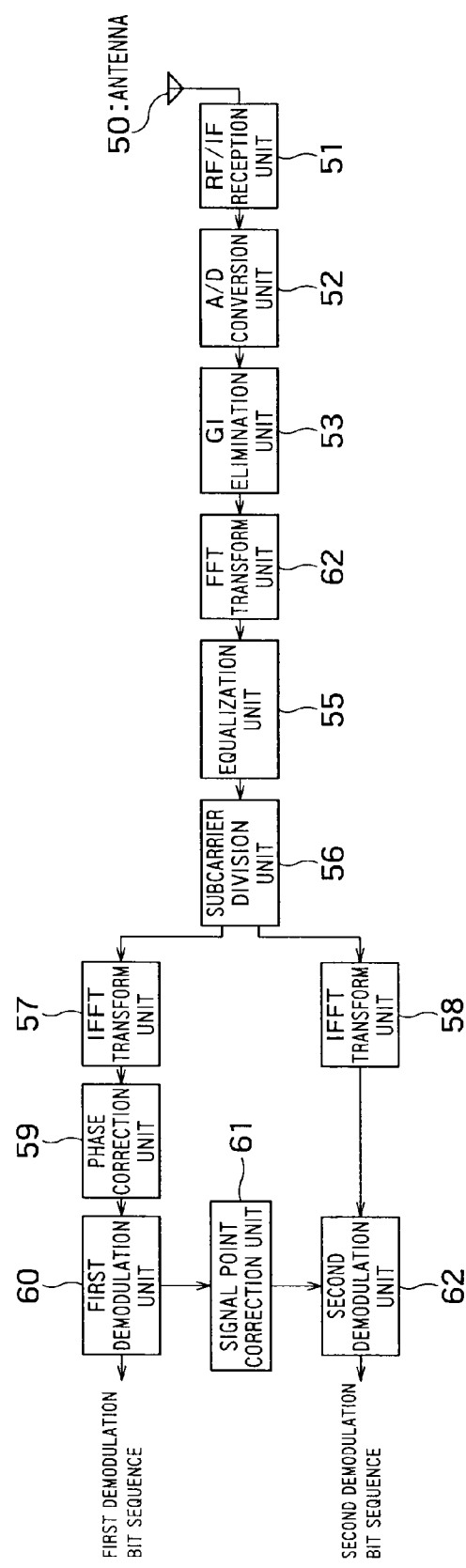
FIG. 48 shows a fifth configuration example of the receiver according to the embodiment of the present invention.

Next, the receiver configuration when the even-numbered frequency components and odd-numbered frequency components are switched round will be explained. In the first and second configuration examples of the receiver, the subcarrier division unit 56 assumes the odd-numbered frequency components of the received frequency data as a first frequency block and the even-numbered frequency components as a second frequency block. That is, this means that in FIG. 41, the first received frequency block and second received frequency block are simply switched round. Furthermore, since the phase correction unit 59 (see FIG. 39) is necessary to correct the odd-numbered frequency components, the phase correction unit before the second demodulation unit 62 becomes unnecessary and in the first configuration example of the receiver, the phase correction unit is inserted before the first demodulation unit 60 instead. A fifth configuration example of the receiver in this embodiment is shown in FIG. 48. This is a configuration example of the receiver with the above described changes added to the first configuration example of the receiver shown in FIG. 39.

Furthermore, in the third and fourth configuration examples of the receiver, only the output of the subcarrier division unit needs to be changed. That is, FIG. 46(*a*) becomes the input to the IFFT transform unit 67 for a second bit sequence and FIG. 46(*b*) becomes the input to the IFFT transform unit 66 for a first bit sequence.

Using the above described method, the present invention is also applicable to a case where first modulation symbols generated by the first bit sequence are included in the odd-numbered frequency component in the frequency domain after Fourier transform and second modulation symbols generated by the second bit sequence are included in the odd-numbered frequency component.

As described above, this embodiment can realize a transmitter capable of frequency-multiplexing two different data sequences while maintaining modulation signal points of single carrier signals and transmitting the multiplexed signal. Furthermore, this embodiment can realize a receiver capable of demodulating two different data sequences by separating frequency components through Fourier transform while repeating single-carrier signals.

What is claimed is:

1. A transmitter comprising:
a pilot generation unit configured to generate a plurality of pilot symbols;
a bit sequence generation unit configured to invert each bit in a first bit sequence to generate a second bit sequence;
a transmission block generation unit configured to generate a transmission block by giving phase rotation determined according a value of each of bits in the first and second bit sequence to each of the pilot symbols corresponding to each of the bits; and
a transmission unit configured to transmit the transmission block.

2. The transmitter according to claim 1, wherein the pilot generation unit generates
doubled pilot symbols by repeating pilot symbols, as the plurality of pilot symbols, or
pilot symbols and sign-inverted pilot symbols that signs of the pilot symbols are inverted, as the plurality of pilot symbols.

3. The transmitter according to claim 1, wherein
each of the pilot symbols corresponds to any one of signal points of MPSK (Multiple Phase Shift Keying) modulation, and
phase rotation given to each of the pilot symbols is such phase rotation that each of the pilot symbols becomes any one of signal points of MPSK modulation again.

4. The transmitter according to claim 1, wherein, wherein phase of each of the pilot symbols is rotated by 0 radians when the value of the bit corresponding to each of the pilot symbols is 0 and by $\pi/2$ radians when it is 1.

5. A transmitter comprising:
a first modulation unit configured to modulate a first bit sequence to generate a plurality of first modulation symbols;
a signal point set selection unit configured to select a signal point set according to a value of each of the first modulation symbols from a plurality of signal point sets in a relationship of being rotated centered on an origin on an IQ plane;
a second modulation unit configured to modulate each of bits in a second bit sequence using the signal point selected for each of the first modulation symbols corresponding to each of the bits in the second bit sequence to generate a same number of second modulation symbols as the first modulation symbols;
a transmission block generation unit configured to generate a transmission block including transmission symbols two times as many as the first modulation symbols by carrying out addition processing and subtraction processing between each of the first modulation symbols and each of the second modulation symbols corresponding to each of the first modulation symbols; and
a transmission unit configured to transmit the transmission block.

6. The transmitter according to claim 5, further comprising:
a Fourier transform unit configured to generate frequency data which is data in a frequency domain by Fourier-transforming the transmission block;
a subcarrier mapping unit configured to generate mapped data by mapping the frequency data to a plurality of mutually orthogonal subcarriers; and
an inverse Fourier transform unit configured to generate a second transmission block including a plurality of second transmission symbols by inverse-Fourier-transforming the mapped data,
wherein the transmission unit transmits the second transmission block.

7. The transmitter according to claim 5, wherein the signal point selection unit selects a signal point set such that at least any one of straight lines connecting mutually neighboring signal points that define an outside shape of the signal point set becomes perpendicular to a vector connecting between a signal point of a first modulation symbol and the origin.

8. The transmitter according to claim 5, wherein the signal point selection unit selects a signal point set such that a maximum value of amplitudes of signal points corresponding to transmission symbols associated with a first modulation symbol becomes a minimum.

9. The transmitter according to claim 5, wherein the first modulation symbol corresponds to any one of signal points in 8PSK (8 Phase Shift Keying) of amplitude R, the second modulation symbol corresponding to the first modulation symbol corresponds to a signal point of two signal points in a BPSK signal point set of amplitude R in which a straight line connecting the two signal points is perpendicular to a phase of the first modulation symbol, and the transmission symbol corresponds to any one of signal points in 8PSK whose amplitude is $\sqrt{2}R$.

10. A transmitter comprising:

a pilot generation unit configured to generate a plurality of pilot symbols;

a signal point set selection unit configured to select a signal point set according to a value of each of the pilot symbols from a plurality of signal point sets in a relationship of being rotated centered on an origin on an IQ plane;

a second modulation unit configured to modulate each of bits in a second bit sequence using the signal point set selected for each of the pilot symbols corresponding to each of the bits in the second bit sequence to generate a same number of second modulation symbols as the pilot symbols;

a transmission block generation unit configured to generate a transmission block including transmission symbols two times as many as the pilot symbols by carrying out addition processing and subtraction processing between each of the pilot symbols and each of the second modulation symbols corresponding to each of the first modulation symbols; and a transmission unit configured to transmit the transmission block.

11. The transmitter according to claim 10, wherein the signal point set selection unit selects a signal point set such that at least any one of straight lines connecting mutually neighboring signal points that define an outside shape of the signal point set becomes perpendicular to a vector connecting between a signal point of the pilot symbol and the origin.

12. The transmitter according to claim 10, wherein the signal point set selection unit selects a signal point set such that a maximum value of amplitudes of signal points corresponding to transmission symbols associated with a pilot symbol becomes a minimum.

13. The transmitter according to claim 10 wherein each of the pilot symbols corresponds to any one of signal points disposed on a circumference of a circle of amplitude R1, each of the second modulation symbols corresponds to any one of two signal points in a BPSK (Binary Phase Shift Keying) signal point set of amplitude R2 in which a straight line connecting the two signal points is perpendicular to a phase of each of the pilot symbols, and each of the transmission symbols corresponds to any one of signal points on a circumference of a circle whose amplitude is $R=\sqrt{R1^2+R2^2}$.

14. A transmitter comprising:

a pilot generation unit configured to generate a plurality of pilot symbols;

a bit sequence reception unit configured to receive a second bit sequence made up of a same number of bits as the pilot symbols;

a bit inversion unit configured to invert each of bits in the second bit sequence according to a signal point of each of the pilot symbols corresponding to each of the bits in the second bit sequence to obtain an inverted second bit sequence;

a first block generation unit configured to generate a first block including doubled pilot symbols by repeating the pilot symbols or generate a first block including the pilot symbols and sign-inverted pilot symbols that signs of the pilot symbols are inverted;

a second block generation unit configured to generate a third bit sequence by inverting each bit of the inverted second bit sequence and generate a second block by combining the inverted bit sequence and the third bit sequence each other;

a transmission block generation unit configured to generate a transmission block by giving phase rotation determined according to a value of each of bits in the second block to each of the pilot symbols in the first block corresponding to each of the bits in the second block; and a transmission unit configured to transmit the transmission block, wherein each of the pilot symbols in the first block corresponds to any one of signal points of MPSK (Multiple Phase Shift Keying) modulation, and phase rotation given to each of the pilot symbols in the first block is such phase rotation that each of the pilot symbols becomes any one of signal points of MPSK modulation again.

15. A receiver comprising:

a Fourier transform unit configured to Fourier-transform a received signal to decompose the received signal into a plurality of frequency components;

a separation unit configured to separate the frequency components into first received frequency data made up of every other first frequency components and second received frequency data made up of every other second frequency components which are different from the respective first frequency components;

a first inverse Fourier transform unit configured to inverse-Fourier-transform the first received frequency data to obtain a first symbol sequence including a plurality of first received symbols;

a second inverse Fourier transform unit configured to inverse-Fourier-transform the second received frequency data to obtain a second symbol sequence including a same number of second received symbols as the first received symbols;

a first demodulation unit configured to demodulate each of the first received symbols included in the first symbol sequence;

a phase correction unit configured to add phase rotation determined according to a position in the second symbol sequence to each of the second received symbols;

a signal point set selection unit configured to select a signal point set according to a value of each of the first received symbol from a plurality of signal point sets in a relationship of being rotated centered on an origin on an IQ plane; and a second demodulation unit configured to demodulate each of phase-rotated second received symbols based on a signal point set selected for each of the first received symbol corresponding to each of the phase-rotated second received symbols.

* * * * *